(12) United States Patent
Kim et al.

(10) Patent No.: US 9,079,105 B2
(45) Date of Patent: Jul. 14, 2015

(54) METHOD AND APPARATUS FOR MANAGING TEAM IN ONLINE GAME

(75) Inventors: Jeong Hun Kim, Seoul (KR); Sun Hwa Choi, Gyeonggi-do (KR); Jae Hyun Choi, Gyeonggi-do (KR); Jong Hee Han, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 13/988,086

(22) PCT Filed: May 22, 2012

(86) PCT No.: PCT/KR2012/004015
§ 371 (c)(1),
(2), (4) Date: May 17, 2013

(87) PCT Pub. No.: WO2013/100277
PCT Pub. Date: Jul. 4, 2013

(65) Prior Publication Data
US 2014/0329594 A1 Nov. 6, 2014

(30) Foreign Application Priority Data

Dec. 29, 2011 (KR) .................. 10-2011-0145977

(51) Int. Cl.
*A63F 9/24* (2006.01)
*A63F 13/30* (2014.01)
(Continued)

(52) U.S. Cl.
CPC .................. *A63F 13/12* (2013.01); *A63F 13/40* (2014.09); *A63F 13/47* (2014.09); *A63F 13/50* (2014.09);
(Continued)

(58) Field of Classification Search
CPC . A63F 13/10; A63F 13/12; A63F 2300/5546; A63F 2300/6018; A63F 2300/8005; A63F 2300/8052; A63F 13/40; A63F 13/47; A63F 13/50; A63F 13/52; A63F 13/53; A63F 13/537; A63F 13/5372; A63F 13/5375; A63F 13/828
See application file for complete search history.

(56) References Cited

U.S. PATENT DOCUMENTS 6,155,924 A * 12/2000 Nakagawa et al. ............. 463/4
6,168,519 B1 * 1/2001 Nakagawa et al. ............. 463/4
(Continued)

FOREIGN PATENT DOCUMENTS

JP      2004-008578 A    1/2004
KR     10-0367572 B1    12/2002
(Continued)

OTHER PUBLICATIONS

Written Opinion and International Search Report issued in International Application No. PCT/KR2012/004015 mailed Nov. 14, 2012, 6 pages.

*Primary Examiner* — Lawrence Galka
(74) *Attorney, Agent, or Firm* — Rothwell, Figg, Ernst & Manbeck, P.C.

(57) ABSTRACT

A method for managing a team in an online game includes, by a team management apparatus, configuring a team management screen, displaying the team management screen that contains information on at least one preset formation upon receiving a signal indicating that the user enters the team management screen from the user terminal, setting each information on the at least one formation upon receiving setting related to details of a selected one formation among the at least one formation from the user terminal, judging whether the number of currently set formations is less than a preset maximum number of formations upon receiving a formation addition request signal from the user terminal, and adding the formation if the number of currently set formations is less than the maximum number of formations, and setting a formation change shortcut key.

16 Claims, 13 Drawing Sheets

(51) Int. Cl.
*A63F 13/40* (2014.01)
*A63F 13/50* (2014.01)
*A63F 13/5372* (2014.01)
*A63F 13/537* (2014.01)
*A63F 13/5375* (2014.01)
*A63F 13/828* (2014.01)
*A63F 13/47* (2014.01)
*A63F 13/53* (2014.01)
*G07F 17/32* (2006.01)

(52) U.S. Cl.
CPC ............... *A63F 13/53* (2014.09); *A63F 13/537* (2014.09); *A63F 13/5372* (2014.09); *A63F 13/5375* (2014.09); *A63F 13/828* (2014.09); *G07F 17/3274* (2013.01); *A63F 2300/57* (2013.01)

(56) References Cited

U.S. PATENT DOCUMENTS

| | | | |
|---|---|---|---|
| 6,280,323 B1 * | 8/2001 | Yamazaki et al. | 463/4 |
| 6,371,855 B1 * | 4/2002 | Gavriloff | 463/42 |
| 6,406,372 B1 * | 6/2002 | Turmell et al. | 463/43 |
| 6,530,834 B2 * | 3/2003 | Kondo | 463/4 |
| 8,484,564 B1 * | 7/2013 | Marti et al. | 715/733 |
| 2003/0083128 A1 * | 5/2003 | Mifune et al. | 463/31 |
| 2004/0242294 A1 * | 12/2004 | Shiozawa | 463/9 |
| 2004/0266535 A1 * | 12/2004 | Reeves | 463/42 |
| 2006/0052147 A1 * | 3/2006 | Matthews | 463/4 |
| 2008/0287196 A1 * | 11/2008 | Miki et al. | 463/42 |
| 2011/0124386 A1 * | 5/2011 | Kondo et al. | 463/4 |
| 2011/0294580 A1 * | 12/2011 | Nakamura et al. | 463/42 |
| 2011/0300932 A1 * | 12/2011 | Henderson | 463/30 |
| 2012/0052943 A1 * | 3/2012 | Tsunashima et al. | 463/31 |

FOREIGN PATENT DOCUMENTS

| | | |
|---|---|---|
| KR | 2003-0030902 A | 4/2003 |
| KR | 10-0639383 B1 | 10/2006 |

* cited by examiner

METHOD AND APPARATUS FOR MANAGING TEAM IN ONLINE GAME

CROSS REFERENCE TO RELATED APPLICATIONS AND CLAIM OF PRIORITY

This patent application is a National Phase application under 35 U.S.C. §371 of International Application No. PCT/KR2012/004015, filed May 22, 2012, which claims priority to Korean Patent Application No. 10-2011-0145977 filed Dec. 29, 2011, entire contents of which are incorporated herein by reference.

BACKGROUND

1. Technical Field

The present invention relates to technologies with regard to an online game having a team management function, in which a user may preset a plurality of formations of a plurality of characters on a team, and may immediately change the plurality of preset formations during game play.

2. Description of the Related Art

In recent years, online games have become of great importance in online culture owing to advances in network and computer technologies. Development of online games arouses user demand for various genres of online games, and a wide variety of genres of online games are available at present.

Most current online games are character based. A user may access a game server using a user terminal, and enjoy an online game by selecting and manipulating game characters provided in online games. The characters provided in online games may be free of charge, or may be purchased in game using game points. Assuming that the user possesses a plurality of characters, the user may play a game while changing characters between turns. In an exemplary online game having a character provision function, the user possesses a team consisting of a plurality of characters, and manages the team by individually scouting, employing, or making a contract with each of the plurality of characters constituting the team.

In some team management games, positions of characters on a team during a match may be an important factor in play of the match. In these team management games, that all of the plurality of characters perform the same role is very rare. The plural characters may respectively perform a designated role, and may have different abilities from other characters in order to perform the corresponding role. However, due to the fact that abilities of the plurality of characters are differently set, respective positions of the plurality of characters may be a decisive factor in the victory or defeat of a team in the team management games. That is, a formation, which refers to all the respective positions of the plurality of characters, is an important factor in such a team management game.

A representative example that utilizes such a formation may be an online sports game. In an online sports game, such as baseball and soccer games, a formation that sets respective positions of a plurality of characters is very important for team management. In particular, in the case of an online soccer game, as in a real world soccer, a wide variety of formations may be employed during a given match. In addition, a formation may be a decisive factor in the victory or defeat of a team even in games other than online sports games. For example, among characters generally adopted in online fantasy games, typically, a gladiator is deployed at the front line of a team based on a short attack distance and strong stamina, whereas a magician is deployed at the final line of a team based on a long attack distance, weak stamina, low agility, etc.

Accordingly, setting of a formation may affect the victory or defeat of a team during game play of an online game. However, most conventional online games adopt only a single formation that is preset prior to playing a game. However, in an online game in which a plurality of formations is available, a formation having relative superiority may be present between respective formations. That is, if a team adopts a particular formation, the particular formation may have an advantageous or adverse effect on game play of an opponent team adopting one formation among a plurality of other formations. In this case, conventional online games have no function to change between formations during game play, which inevitably causes user difficulty in playing a match. Moreover, the number of formations settable in a game is often very limited, which results in a low degree of user freedom.

SUMMARY

Therefore, it is an object of the present invention to provide a method for managing a team in an online game, in which a user may set a plurality of formations that represent arrangements of a plurality of characters on a team prior to playing a match, and may set a shortcut key for change between the plurality of formations, which allows the user to immediately and easily change between formations even during game play.

In accordance with one aspect of the present invention, the above and other objects can be accomplished by the provision of a method for managing a team in an online game, the team management method including, by a team management apparatus, configuring a team management screen that allows a user to set a formation that designates respective positions of a plurality of characters included in a team managed by the user, displaying the team management screen that contains information on at least one preset formation including a basic formation on a user terminal upon receiving a signal indicating that the user enters the team management screen from the user terminal, setting each information on the at least one formation upon receiving setting related to details of a selected one formation among the at least one formation from the user terminal, judging whether or not the number of currently set formations is less than a preset maximum number of formations upon receiving a formation addition request signal from the user terminal, and adding the formation if the number of currently set formations is less than the maximum number of formations, and setting a formation change shortcut key that generates an instruction to immediately change the at least one formation during game play.

The display of the team management screen may include displaying a formation addition unit that displays the at least one formation, displaying a formation selection unit that provides a plurality of preset formations each represented in a numerical form, displaying a formation setting unit that displays positions of a plurality of characters corresponding to the selected formation among the at least one formation, displaying a replacement information display unit that displays information on a position of a selected character to be replaced and a position of a replacement character among the plurality of characters displayed on the formation setting unit, displaying a substitute character display unit that displays at least one substitute character that is included in the plurality of characters on the team and is not displayed on the formation setting unit, and displaying position adaptability with respect to each of the plurality of characters displayed on the formation setting unit.

The display of the team management screen may include displaying detailed information including status points of a character selected by the user among the characters displayed on the formation setting unit and the at least one substitute character, and displaying a character management menu display unit that displays an item for batch application to the plurality of characters on the team.

The display of the detailed information may include displaying one of the position adaptability and the detailed information, selected by the user, on the management screen.

The display of the formation addition unit may include displaying the preset at least one formation, judging whether or not the number of the at least one formation is less than the maximum number of formations, and displaying a formation addition button to generate a formation addition request if the number of the at least one formation is less than the maximum number of formations.

The addition of the formation includes receiving a signal for selection of the formation addition button from the user terminal, and adding a preliminary formation that is represented in the same numerical form as that of the basic formation upon receiving the signal for selection of the formation addition button.

The setting of each information on the at least one formation may include judging whether or not one formation among the plurality formations displayed on the formation selection unit is selected, displaying positions of the plurality of characters on the formation setting unit corresponding to the selected formation among the at least one formation displayed on the formation addition unit if the formation is not selected, changing positions of the plurality of characters displayed on the formation setting unit according to the selected formation if one formation among the plurality of formations displayed on the formation selection unit is selected, judging whether or not a movement signal for one character among the plurality of characters displayed on the formation setting unit is received from the user terminal, judging whether or not a distance between a position to which the character is moved upon receiving the movement signal and the most adjacent character is greater than a preset minimum distance between neighboring characters, displaying the moved character at the moved position if the distance between the moved character and the most adjacent character is greater than the preset minimum distance between neighboring characters, judging whether or not to replace the moved character with the most adjacent character if the distance between the moved character and the most adjacent character is less than the preset minimum distance between neighboring characters, and interchanging the position of the moved character with a position of the most adjacent character if a replacement request signal is received from the user terminal.

The display of the positions of the plurality of characters may include displaying character names of the respective characters and position names corresponding to character display positions at positions corresponding to the formation.

The setting of each formation on the at least one formation may include displaying a boundary area, in which the preset position name of the character to be moved may be maintained, upon receiving the movement signal, and changing the preset position name into a position name corresponding to a moved position of the character if the moved position is outward of the boundary area.

The setting of each information on the at least one formation may include judging whether or not a tactic button included in the formation setting unit is selected, and displaying a tactic setting screen to set an offense disposition and a defense disposition of each of the plurality of characters on the formation setting unit if the tactic button is selected, setting the offense disposition and the defense disposition of each of the plurality of characters displayed on the tactic setting screen, judging whether or not a management button included in the formation setting unit is selected, and displaying a character management screen that represents the state of each of the plurality of characters including physical fitness of the character on the formation setting unit if the tactic button is selected, and adjusting the state of each of the plurality of characters displayed on the character management screen.

The display of the tactic setting screen may include displaying positions of the plurality of characters corresponding to the selected formation, displaying an offense disposition adjustment sign to adjust an offense disposition at one side of the respective positions of the plurality of characters, and displaying a defense disposition adjustment sign to adjust a defense disposition at one side of the respective positions of the plurality of characters.

The setting of the offense disposition and the defense disposition of each of the plurality of characters may include adjusting the offense disposition according to a drag signal with respect to the offense disposition adjustment sign of each of the plurality of characters upon receiving the drag signal from the user terminal, and adjusting the defense disposition according to a drag signal with respect to the defense disposition adjustment sign of each of the plurality of characters upon receiving the drag signal from the user terminal.

The setting of the offense disposition and the defense disposition of each of the plurality of characters may include judging whether or not the offense disposition is less than a preset maximum offense disposition upon receiving a signal for selection of the offense disposition adjustment sign of each of the plurality of characters from the user terminal, increasing the offense disposition if the offense disposition is less than the maximum offense disposition, setting the offense disposition to a preset minimum offense disposition if the offense disposition exceeds the maximum offense disposition, judging whether or not the defense disposition is less than a preset maximum defense disposition upon receiving a signal for selection of the defense disposition adjustment sign of each of the plurality of characters from the user terminal, increasing the defense disposition if the defense disposition is less than the maximum defense disposition, and setting the defense disposition to a preset minimum defense disposition if the defense disposition exceeds the maximum defense disposition.

The display of the character management screen may include displaying the physical fitness of each of the plurality of characters at a position corresponding to the selected formation, and if one of the plurality of characters is penalized for a disciplinary infraction in a previously performed game, displaying the disciplinary infraction on the corresponding character.

The adjustment of the state of each of the plurality of characters may include displaying a ring menu that consists of a plurality of menus arranged in a circular form around the character selected by the user terminal among the plurality of characters, displaying a plurality of sub-menus corresponding to a selected menu if one menu among the plurality of menus of the ring menu is selected, and performing an action corresponding to a selected sub-menu if one sub-menu among the plurality of sub-menus is selected.

The display of the position adaptability may include acquiring position adaptability of each of the plurality of characters displayed on the formation setting unit corresponding to the selected formation, and displaying the position adaptability of each of the plurality of characters on a per position basis as a graph.

In accordance with another aspect of the present invention, there is provided an apparatus for managing a team in an online game, the team management apparatus including a team information storage unit that stores information on a plurality of teams, at least one formation of each of which is preset, a character information storage unit that stores information on a plurality of characters included in each of the plurality of teams, an item information storage unit that stores information on a plurality of items that may be provided in the online game, and a team management setting unit that acquires information on a team possessed by a user and information on a plurality of characters included in the user team from the team information storage unit and the character information storage unit upon receiving a team management screen request signal from a user terminal, that configures a team management screen displaying positions of the plurality of characters according to at least one formation included in the team information to thereby display the team management screen on the user terminal, and that judges whether or not the number of currently set formations is less than a preset maximum number of formations upon receiving a formation addition request signal from the user terminal, and adds the formation if the number of currently set formations is less than the maximum number of formations.

The team management screen may include a formation addition unit that displays the at least one formation, a formation selection unit that provides a plurality of preset formations each represented in a numerical form, a formation setting unit that displays positions of a plurality of characters corresponding to a selected formation among the at least one formation, a replacement information display unit that displays information on a position of a selected character to be replaced and a position of a replacement character among the plurality of characters displayed on the formation setting unit, a substitute character display unit that displays at least one substitute character that is included in the plurality of characters on the team and is not displayed on the formation setting unit, and a position adaptability display unit that displays position adaptability with respect to each of the plurality of characters displayed on the formation setting unit.

The team management setting unit may store the plurality of preset formations each represented in a numerical form, and may change positions of the plurality of characters displayed on the formation setting unit according to the selected formation upon receiving a signal for selection of one formation among the plurality of formations from the user terminal.

According to the present invention, in an online game in which a user performs a match via team management, the user may set a plurality of formations that represent arrangements of a plurality of characters on a team prior to playing a match, and may freely change between formations using a shortcut key during game play. This ensures efficient implementation of a match by the user. In addition, the user may arbitrarily adjust positions of the plurality of characters with respect to each of a plurality of formations from among basic positions provided in a game, thereby being capable of setting a formation that is optimal for a user team. Moreover, when deploying the respective characters on the team at particular positions, information on adaptability at corresponding respective positions of the plurality of characters as well as information on win rates of given respective formations may be provided to the user, which allows the user to set an optimized formation. As a result, it is possible to provide a high degree of freedom in user team management and to enhance user interest in a game.

DETAILED DESCRIPTION

Figure 1:
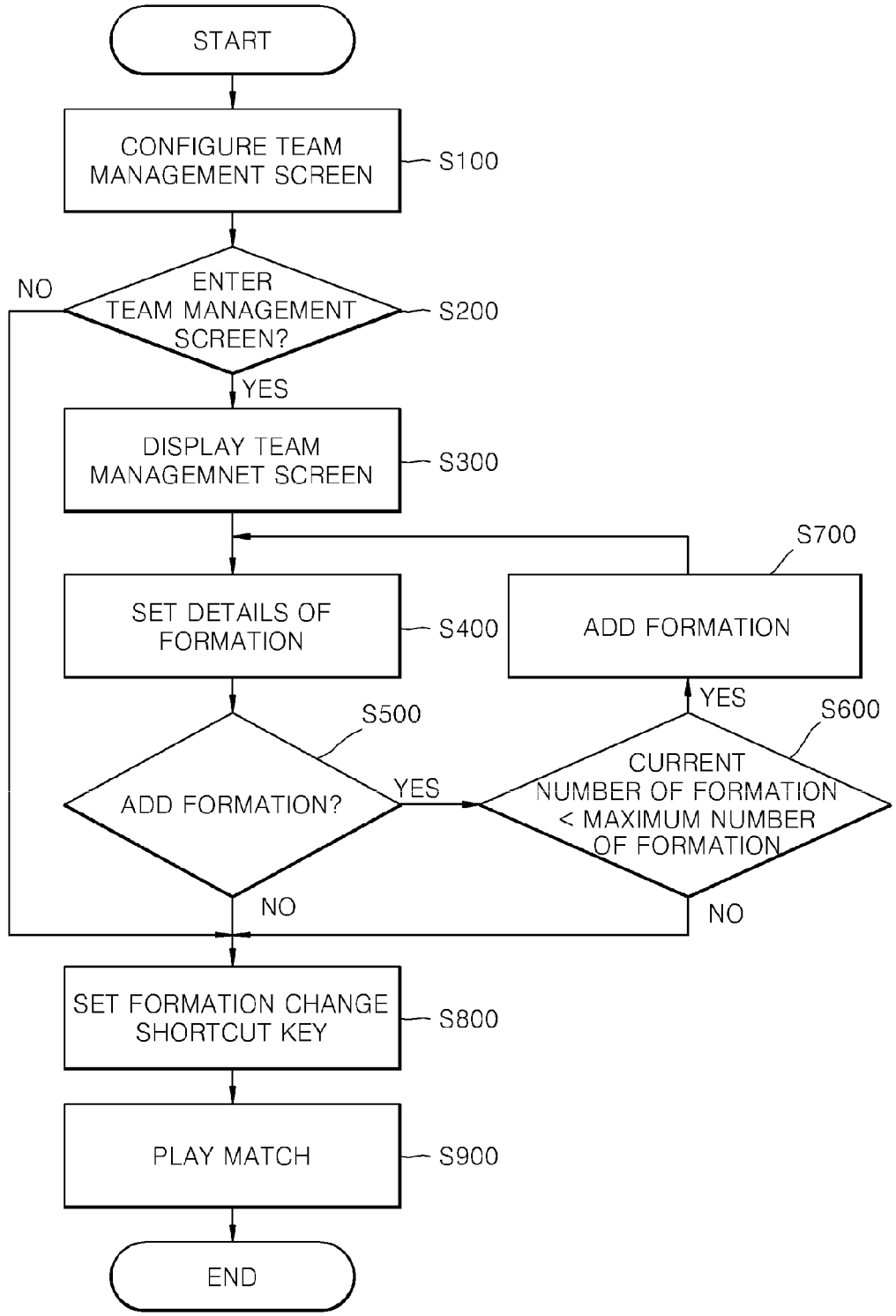
FIG. 1 is a flowchart of a method for managing a team in an online game according to an embodiment of the present invention.

Hereinafter, an apparatus and method for managing a team in an online game according to the embodiments of the present invention will be described with reference to the accompanying drawings.

Those skilled in the art will appreciate that the following embodiments are given to aid in understanding of the present invention and there is no intent to limit the technical sprit of the present invention. Accordingly, other equivalent inventions that perform the same functions as those of the present invention will be within the scope of the present invention.

With regard to add reference numerals to constituent elements shown in the respective drawings, it is noted that, wherever possible, the same or similar elements are denoted by the same reference numerals even though they are depicted in different drawings. In addition, in the following description of the present invention, a detailed description of known functions and configurations incorporated herein will be omitted when it may make the subject matter of the present invention rather unclear.

Additionally, with regard to describe constituent elements of the present invention, the terms first, second, A, B, (a), (b), etc. may be used. It will be understood that these terms are only used to distinguish the corresponding constituent elements from the other constituent elements, and essence, sequence, or the like of the corresponding constituent elements should not be limited by these terms. In the case in which some constituent elements are described as being "connected", "coupled", or "linked" to the other constituent elements, it should be understood that, although the corresponding constituent elements may be directly connected or coupled to the other constituent elements, additional constituent elements may be "connected", "coupled", or "linked" between the respective constituent elements.

In the embodiments of the present invention, the terms "communication", "communication network", and "network" may be used interchangeably. The three terms refer to as wired/wireless local area and wide area data transmission/reception networks to enable transmission/reception of files between user terminals and between a user terminal and a download server.

In the following description, the term "game server" refers to a server computer that a user accesses to use game content. In the case of a game, the capacity of which is small or the number of users of which is small, a single game server may manage a plurality of game programs. In addition, in the case of a game, the capacity of which is very great or the number of real time access users is great, one or more game servers may be present to manage a single game according to the function of the game.

Additionally, although database middleware or payment processing servers may be connected to a game server, a description thereof will be omitted in the present disclosure.

In the present invention, a character refers to all characters that appear in an online sports game that allows the user to experience a particular sport. Additionally, in the present invention, player characters refer to characters modeled after real world professional athletes. If a game of the present invention is a sports game, characters refer to player characters. That is, in the present invention, if an online game is an online sports game, "character" is taken to have the same meaning as "player character".

A character is displayed on a game screen and is adapted to perform predetermined actions within a range of a corresponding game according to user manipulation. In addition, the character may be raised in level by accumulating predetermined experience points according to game implementation results, and in turn status points of the character may be increased in proportion to the level of the character.

In the present invention, character's skills may be set in various ways according to characteristics of each game. In the case of an online soccer game, kinds of character's skills may be set to ball control, offense, pass, defense, and goal keeping, for example, which represent skills of a player corresponding to a character. The respective skills may be further subdivided according to setting conditions of a game. For example, with regard to ball control of an online soccer game, detailed skills, such as endurance, stamina, composure, etc., may be provided. The user may convert experience points into respective skills at different rates, and thus grow an initial character having predetermined properties into different characters having different properties according to a user selected conversion of the experience points into skill status points. That is, even if plural users play a game using the same character, properties of the character may be differentiated as the respective users convert experience points into various different kinds of skill status points, which results in growth of characters having different properties.

In the present invention, sports refer to general sports including all sports that may be executed into online games. For example, sports may include soccer, baseball, basketball, tennis, volleyball, track and field athletics, and martial arts.

In the present invention, the amount of money and costs required to use characters refers to cyber money or game points that may be used to purchase characters or items in an online soccer game, rather than referring to the amount of real money. Cyber money and game points may be acquired via implementation of a game, and as occasion demands may be acquired by selling items acquired during implementation of a game in a virtual game shop. In addition, according to games, cyber money may be acquired by paying real money. Although the amount of real money and the amount of cyber money may correspond to each other in a one to one ratio, they are generally set in different ratios. In addition, according to games, cyber money may be changed into game points of an online soccer game. That is, cyber money and game points may be interchanged, or change from cyber money to game points or vice versa may be possible.

FIG. 1 is a flowchart of a method for managing a team in an online game according to an embodiment of the present invention.

Explaining the method for managing a team in an online game according to the present invention with reference to FIG. 1, first, a team management apparatus configures a team management screen to assist a user in easily managing a team (S100). Preferably, the team management screen provides as much visual information as possible to assist the user in more easily managing a team. A variety of team management screens may be configured according to games. If there are many categories to be managed, a game screen may be divided into several areas, or a plurality of tabs may be provided. In the latter case, if one tab is selected, a category corresponding to the selected tab may be displayed on the management screen.

Thereafter, it is judged whether or not the user enters the team management screen via a user terminal (S200). If the user does not enter the team management screen, it may be judged that the user wishes to play a match while maintaining current team settings. Accordingly, the user may immediately play a match (S900).

On the other hand, if the user enters the team management screen, the team management apparatus displays the team management screen on the user terminal (S300). The team management screen is displayed according to a preset configuration. In a configuration in which a plurality of tabs is provided such that information regarding a selected tap is displayed, tab information is set to default and displayed on the team management screen.

After the team management screen is displayed, the user adjusts details of a currently set formation for a team via the user terminal, and the team management apparatus sets the details of the formation according to settings received from the user terminal (S400). The details of the formation may include change between formations, setting of respective positions of a plurality of characters on a team, replacement of characters at different positions, and position change, for example. A detailed description with regard to setting of the details of the formation will follow.

After the details of the current formation are set, it is judged whether or not a formation addition request signal is received (S500). The online game of the present invention may provide a plurality of formations, rather than providing only one formation. However, since the other formations except for one basic formation are additionally set by the user, these formations are added only upon receiving the formation addition request signal from the user.

If the formation addition request signal is received, the team management apparatus judges whether or not the number of formations currently set by the user is less than a preset maximum number of possible formations of a game (S600). As such, the online game of the present invention provides the user with a plurality of formations to allow the user to change between formations during game play. However, if an unlimited number of formations are allowed, the amount of data to be stored in the team management apparatus is rapidly increased, which may cause overload of the team management apparatus. Moreover, a large number of formations may make it difficult for the user to comprehend which formation has been selected. Therefore, it is preferable to preset a maximum number of formations. In the present invention, in one example, the maximum number of formations is assumed to be 4.

If the judged result shows that the number of formations currently set in the game is less than the maximum number of formations, a new formation is added (S700). In this case, the new formation is equal to a formation that is preset by the user.

After the formation is added, setting of the details of the formation (S400) is repeated to perform change between formations, setting of respective positions of the plurality of characters on a team, replacement of characters at the respective positions, or position change.

If the number of formations currently set by the user is equal to or greater than the maximum number of formations, a new formation is not added. In this case, the team management apparatus may present a notice indicating that the number of formations currently set by the user has reached the maximum number of formations on the user terminal.

After formation addition and setting of the details are completed, a shortcut key for change between formations is set (S800). During game play, the user is prevented from entering the team management screen for change between formations. Thus, the team management apparatus has to provide a shortcut key to allow the user to select a particular key of a keyboard so as to easily change between formations during game play. Typically, since change between formations is not frequently required during game play, the shortcut key need not be readily accessible by the user. That is, since the shortcut key is used infrequently, one key on a number keypad of the keyboard may be set to the change shortcut key. In the present invention, in one example, the 0 key on the number keypad is assumed to be the shortcut key for change between formations. Although the shortcut key is typically preset by the team management apparatus and provided to the user, as occasion demands, the user may directly set the shortcut key for change between formations.

After setting of the at least one formation is completed and the shortcut key for change between formations is set, the user may complete team management and play a match (S900).

Consequently, the method for managing a team in an online game according to the present invention as described above with reference to FIG. 1 may allow the user to set a preliminary formation in addition to a basic formation, to set details of each formation, and to immediately change between a plurality of formations using a shortcut key for change between formations during game play.

Figure 2:
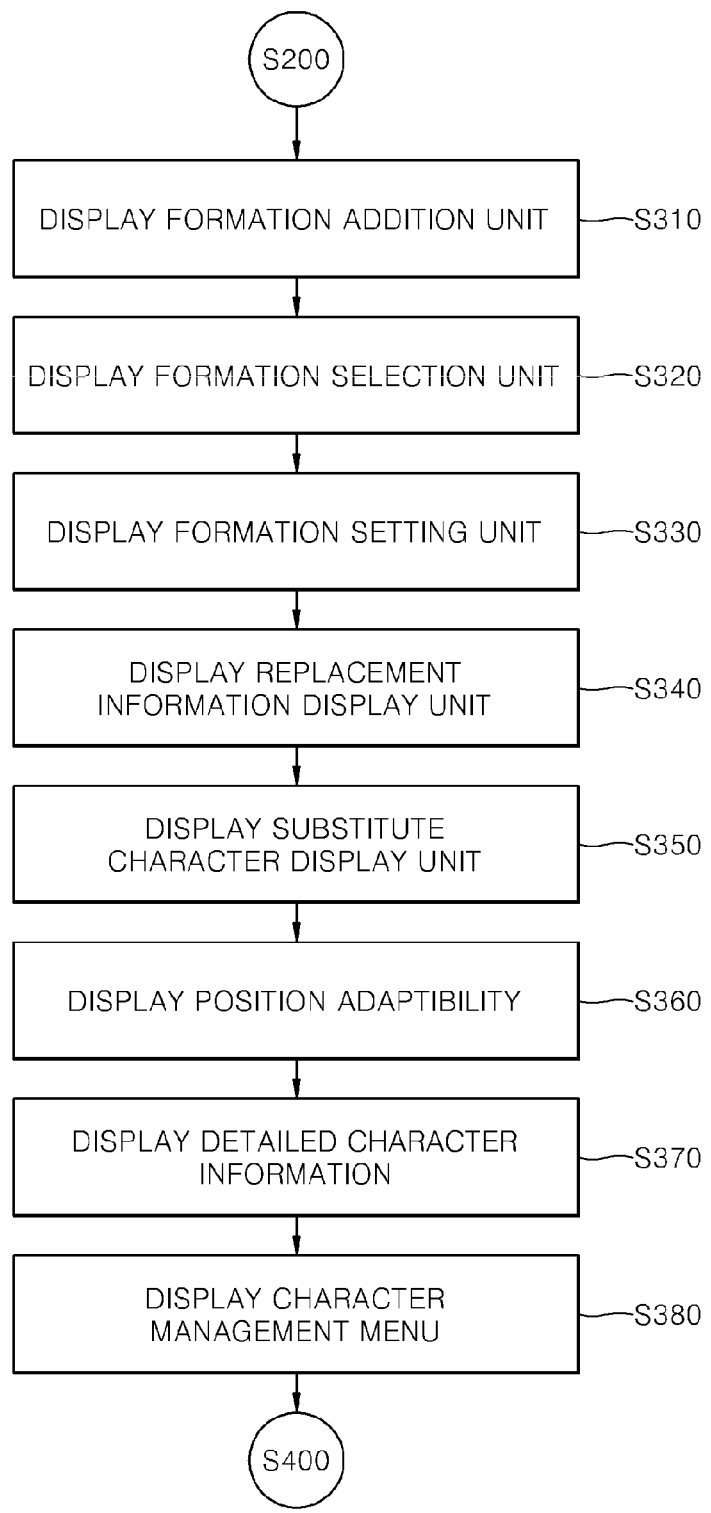
FIG. 2 is a flowchart showing display of a team management screen according to an embodiment of the present invention.
Figure 3:
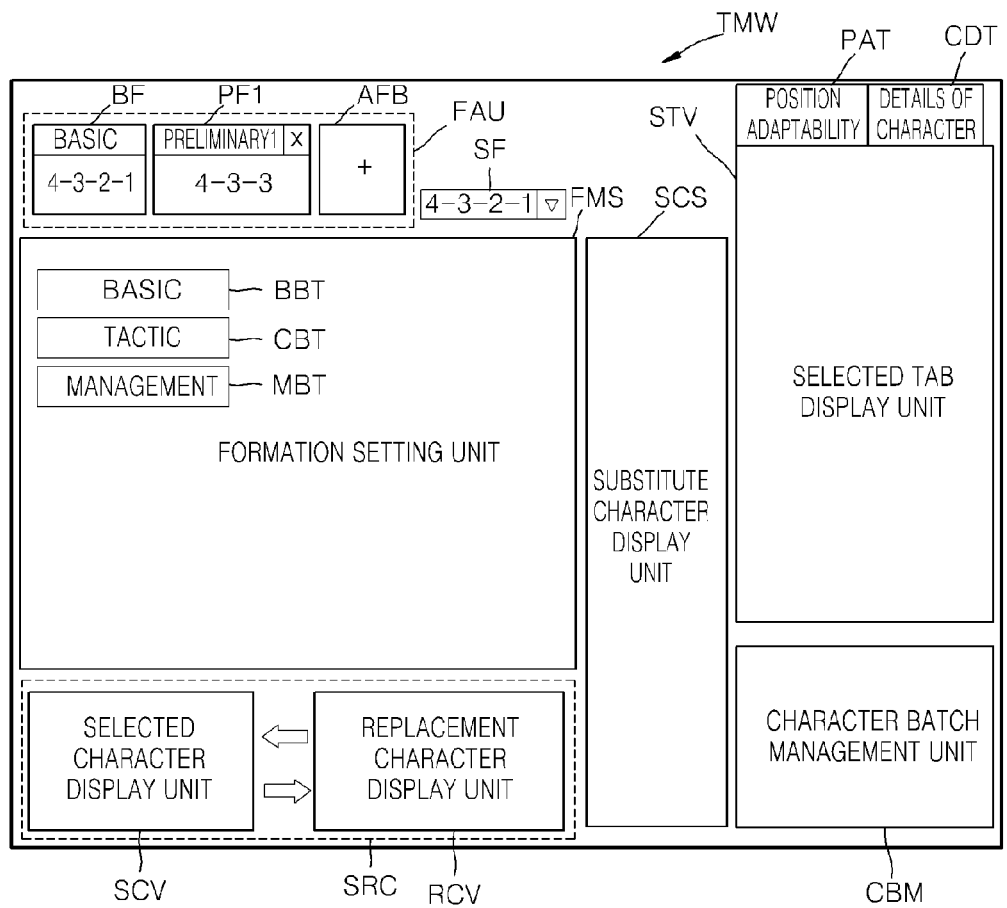
FIG. 3 is a view showing a team management screen according to an embodiment of the present invention.

FIG. 2 is a flowchart showing display of a team management screen according to an embodiment of the present invention, and FIG. 3 is a view showing a team management screen according to an embodiment of the present invention.

Explaining the sequence of displaying the team management screen (TMW) as exemplarily shown in FIG. 3, a formation addition unit FAU is displayed on the team management screen (S310). The formation addition unit FAU contains at least one formation. A formation provision online game typically provides one basic formation. Since at least one formation must be set to play a match, the online game provides the basic formation BF simultaneously with generation of a team, although even the basic formation BF is changeable by the user. If the user changes the basic formation BF, the resulting changed formation serves as the basic formation BF. In addition, if a preliminary formation PF1 added by the user is present, the preliminary formation is also displayed on the formation addition unit FAU, so as to allow the number and kind of formations set by the user to be displayed. The formation addition unit FAU further provides a formation addition button AFB to allow the user to add a preliminary formation if the number of formations set by the user is less than the maximum number of formations.

Each of the basic formation BF and the preliminary formation PF1 displayed on the formation addition unit FAU is represented by numbers that show a formation form. Here, the formation form refers to basic information regarding each a team shape, i.e. regarding the arrangement of a plurality of characters constituting a team. An online soccer game expresses a formation using a method that is used in a real world soccer game. For example, in a real world soccer game, according to the arrangement of players except for a goalkeeper, a formation is expressed by 4-3-3, 4-3-2-1, etc. Accordingly, in the case of an online soccer game, each of the basic formation BF and the preliminary formation PF1 displayed on the formation addition unit FAU may show a numerical arrangement form with regard to a formation of a real world soccer game, such as 4-3-3, 4-3-2-1, etc.

In the present invention, for convenience of description, an online game having a team management function is assumed to be an online soccer game. However, it will be appreciated that the present invention is not limited to online soccer games.

In addition, a formation deletion button may be displayed next to the preliminary formation PF1. Differently from the basic formation BF that is essential to game play, the preliminary formation PF1 refers to an optional formation for user convenience. Although the preliminary formation PF1 is also changeable by the user in the same manner as the basic formation BF, the user may wish to delete the preliminary formation PF1 as occasion demands. To this end, the deletion button may be displayed next to the preliminary formation PF1, so that the user may delete the preliminary formation as desired.

Although FIG. 3 shows only one preliminary formation PF1 by way of example, a plurality of preliminary formations may be provided.

After the formation addition unit is displayed, a formation selection unit SF is displayed (S320). The formation selection unit displays a plurality of formations preset by the team management apparatus. That is, assuming that the team management apparatus presets a plurality of formations, such as 4-2-4, 4-3-3, and 4-4-2, and the user selects one of the plurality of formations, a plurality of characters on a team will be arranged according to the selected formation. The user may have difficulty in directly correcting positions of a plurality of characters individually in order to set a plurality of formations. Accordingly, in an online game, it is preferable that the team management apparatus preset a plurality of formations to allow the user to select a desired one of the plurality of formations, and thereafter to simply adjust respective positions of a plurality of characters in the selected formation, which ensures easier user setting of the plurality of formations.

Thereafter, the team management apparatus displays a formation setting unit FMS (S330). The formation setting unit FMS displays positions of a plurality of characters arranged according to a formation that is selected from among the basic formation BF and the preliminary formation PF1. In addition, the formation setting unit FMS may allow the user to adjust respective positions of the plurality of characters. More specifically, the formation setting unit FMS may include a basic button BBT, a tactic button CBT, and a management button MBT, to allow the user to adjust a disposition and state of each character as well as respective positions of the plurality of characters. A detailed description of the formation setting unit FMS will follow.

After the formation setting unit FMS is displayed, a replacement information display unit SRC is displayed (S340). The replacement information display unit SRC is an area that displays replacement information regarding a character selected by the user and regarding a character to replace the selected character, among the plurality of characters displayed on the formation setting unit FMS. When the user attempts to perform character replacement, the replacement information display unit provides the user with information on whether or not replacement of characters is suitable. The replacement information display unit SRC, as exemplarily shown in FIG. 3, may include a selected character display unit SCV that displays a character selected by the user, and a replacement character display unit RCV that displays a replacement character that will replace the selected character and will be arranged at a particular position of a formation. The selected character display unit SCV and the replacement character display unit RCV may respectively display basic information required for replacement of characters, including adaptability of a character to a current position as well as adaptability of the character to a replacement position. The user may easily judge suitability for replacement of characters by checking information on the selected character and the replacement character displayed on the replacement information display unit SRC.

Then, the team management apparatus displays a substitute character on a substitute character display unit SCS. A team management game may possess a substitute character except for a character that directly participates in a match. The substitute character is also a character included in a team. Accordingly, replacement of characters may occur not only between characters arranged in a selected formation, but also between a character arranged in a selected formation and a substitute character not arranged in the selected formation. The substitute character display unit SCS is an area that displays a substitute character that is not arranged in a currently selected formation, but is included in a team.

After the substitute character is displayed, position adaptability PAT is displayed (S360). The position adaptability PAT is a menu that shows a chart of adaptability of a plurality of characters, arranged in a selected formation, to respective positions thereof. Although the replacement information display unit SRC also shows the position adaptability, this is related to position adaptability of one particular selected character. However, in terms of the user that has to manage a team, it is necessary to manage the whole team and it is difficult to check position adaptability of each character by individually selecting a plurality of characters. Accordingly, in the present invention, by providing a chart of adaptability of all of the plurality of characters, arranged in the selected formation, to respective positions thereof, it is possible to assist the user in judging whether or not a given team formation is suitable.

Thereafter, the team management apparatus displays a detailed character information CDT (S370). Similar to the selected character display unit SCV, the detailed character information CDT is information on the selected character. However, the detailed character information CDT further includes information on all details of the selected character including a level, status points, etc., differently from the selected character display unit SCV that displays only content required to check position adaptability of the selected character.

Although the above description exemplifies that both the position adaptability PAT and the detailed character information CDT are displayed, as exemplarily shown in FIG. 3, preferably, the position adaptability PAT and the detailed character information CDT are respectively provided in the form of tabs, and content corresponding to the selected tab is displayed on a selected tab display unit STV.

Finally, the team management apparatus displays a character management menu on a character batch management unit CBM (S380). In team management, it is important to check a current state of each of the plurality of characters and maintain each character in the best state, although setting respective positions of the plurality of characters on a team is important. However, a method in which the user checks and adjusts the state of each character by selecting the plurality of characters individually is inefficient. Accordingly, through provision of the character batch management unit CBM, the present invention may provide batch management of the plurality of characters arranged in the selected formation. The character batch management unit CBM may function to aid a character to recover physical fitness, to facilitate a recovery from an injury, and to increase the ability of a character, for example. These functions of the character batch management unit CBM may be represented as items. That is, the user may use any one of the functions provided by the character batch management unit CBM only when the user has an item corresponding to the function.

Figure 4:
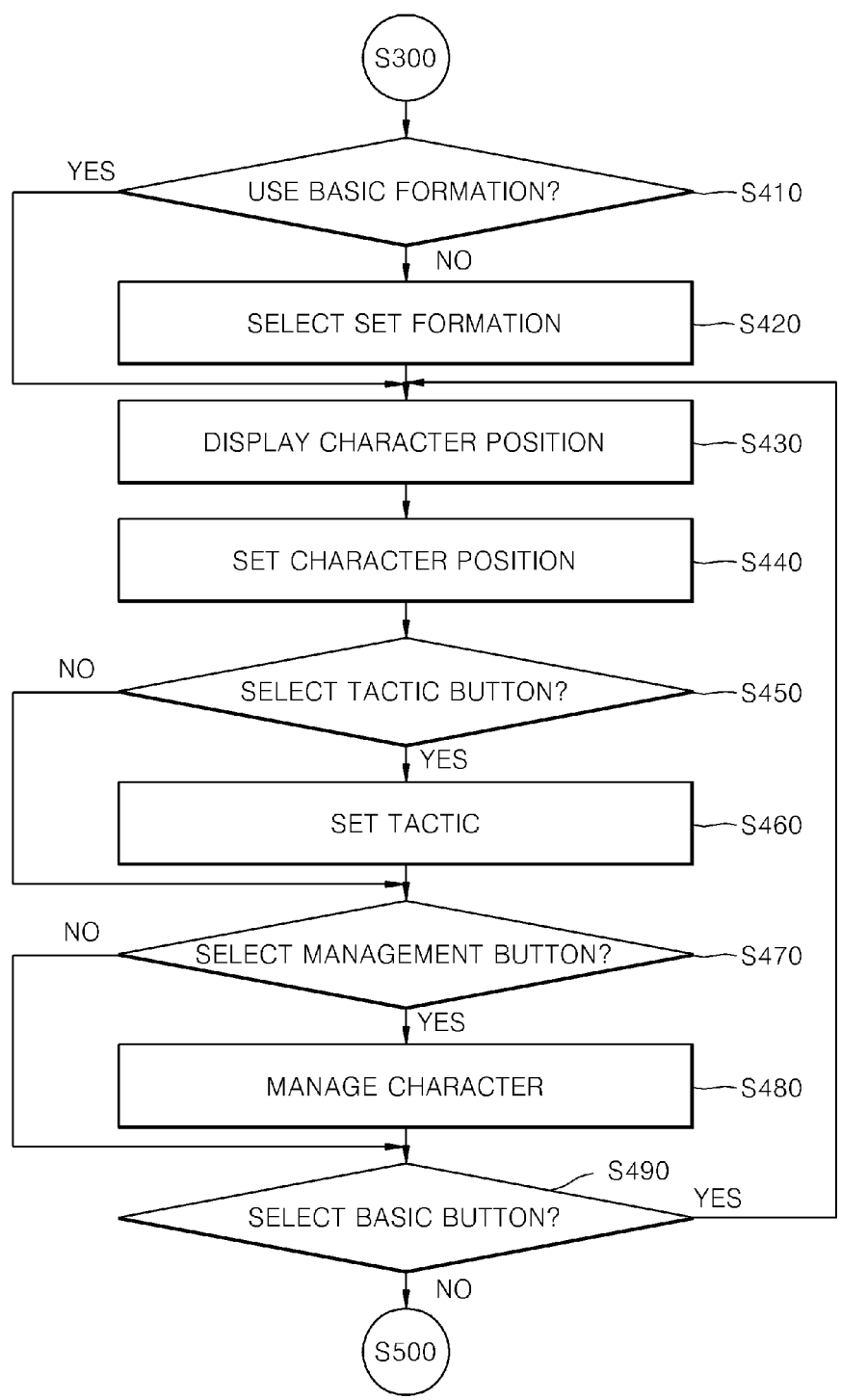
FIG. 4 is a flowchart showing setting of formation details according to an embodiment of the present invention.

FIG. 4 is a flowchart showing setting of formation details according to an embodiment of the present invention.

Explaining the sequence of setting formation details with reference to the team management screen exemplarily shown in FIG. 3, first, the team management apparatus judges whether or not the user uses the basic formation BF (S410). The basic formation BF, as described above, is a formation basically provided in an online game, or a formation previously changed by the user. In addition, if the preliminary formation PF1 is added, the added preliminary formation PF1 is set so as to be equal to the basic formation so long as the user does not change the formation.

If the user decides to not use the basic formation BF, the user may select one formation among a plurality of formations set in the formation selection unit SF via the user terminal (S420). However, if the user decides to use the basic formation BF, the user need not select a formation from the formation selection unit SF.

If the basic formation is used, or if one formation is selected from the formation selection unit SF, respective positions of a plurality of characters are displayed on the formation setting unit FMS according to the selected formation (S430). Display of the respective positions of the characters is accomplished based on settings of the basic button BBT of the formation setting unit FMS. In the present invention, it is assumed that the basic button BBT is set to default and is displayed on the formation setting unit FMS.

After the respective positions of the plurality of characters are displayed on the formation setting unit FMS, the respective positions of the plurality of characters are set by instructions applied from the user terminal (S440). In this case, the user may perform replacement of a plurality of characters, and change of respective positions of the plurality of characters, for example. A detailed description of setting of the positions of the characters (S440) will follow.

After the positions of the characters are set, it is judged whether or not the tactic button CBT is selected (S450). If the tactic button CBT is selected, a screen to set a disposition of each character is displayed on the formation setting unit FMS, and the user sets a tactic by adjusting the disposition of each character (S460). A method for adjusting the disposition of each character will be described hereinafter.

Then, the team management apparatus judges whether or not the management button MBT is selected (S470). If the management button MBT is selected, a screen to check the state of each character is displayed on the formation setting unit FMS, and the user manages the plurality of characters by selecting each character and adjusting the state of the selected character (S480).

If the basic button BBT is selected, the team management apparatus again displays the respective positions of the characters (S430), to allow the user to set the positions of the characters.

Figure 5:
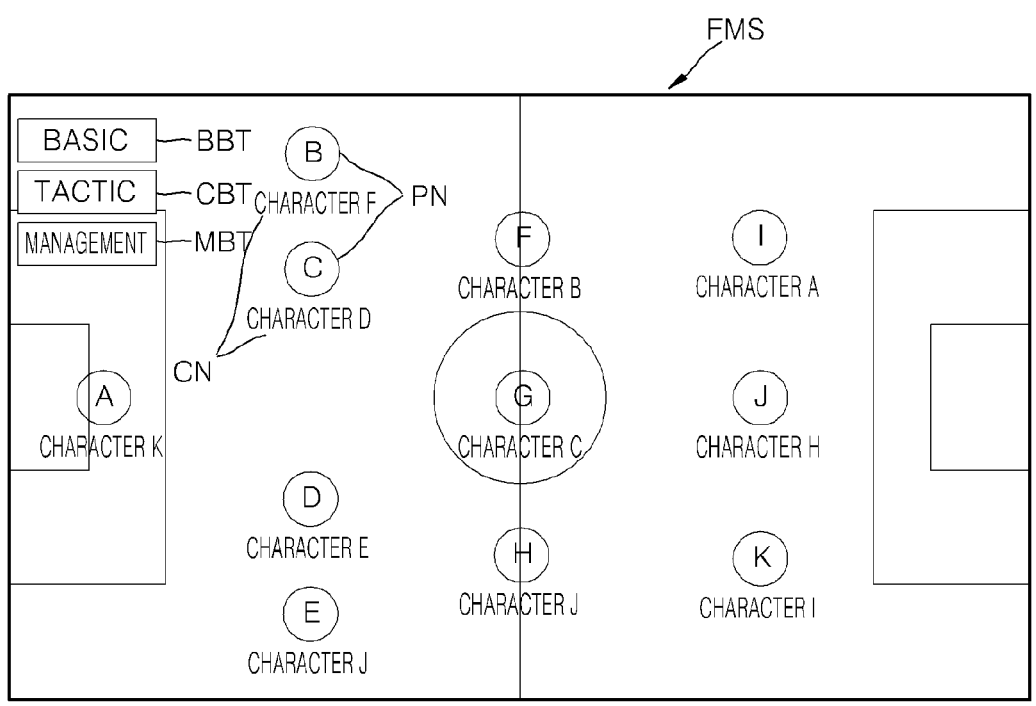
FIG. 5 is a view showing a character position setting screen according to an embodiment of the present invention.
Figure 6:
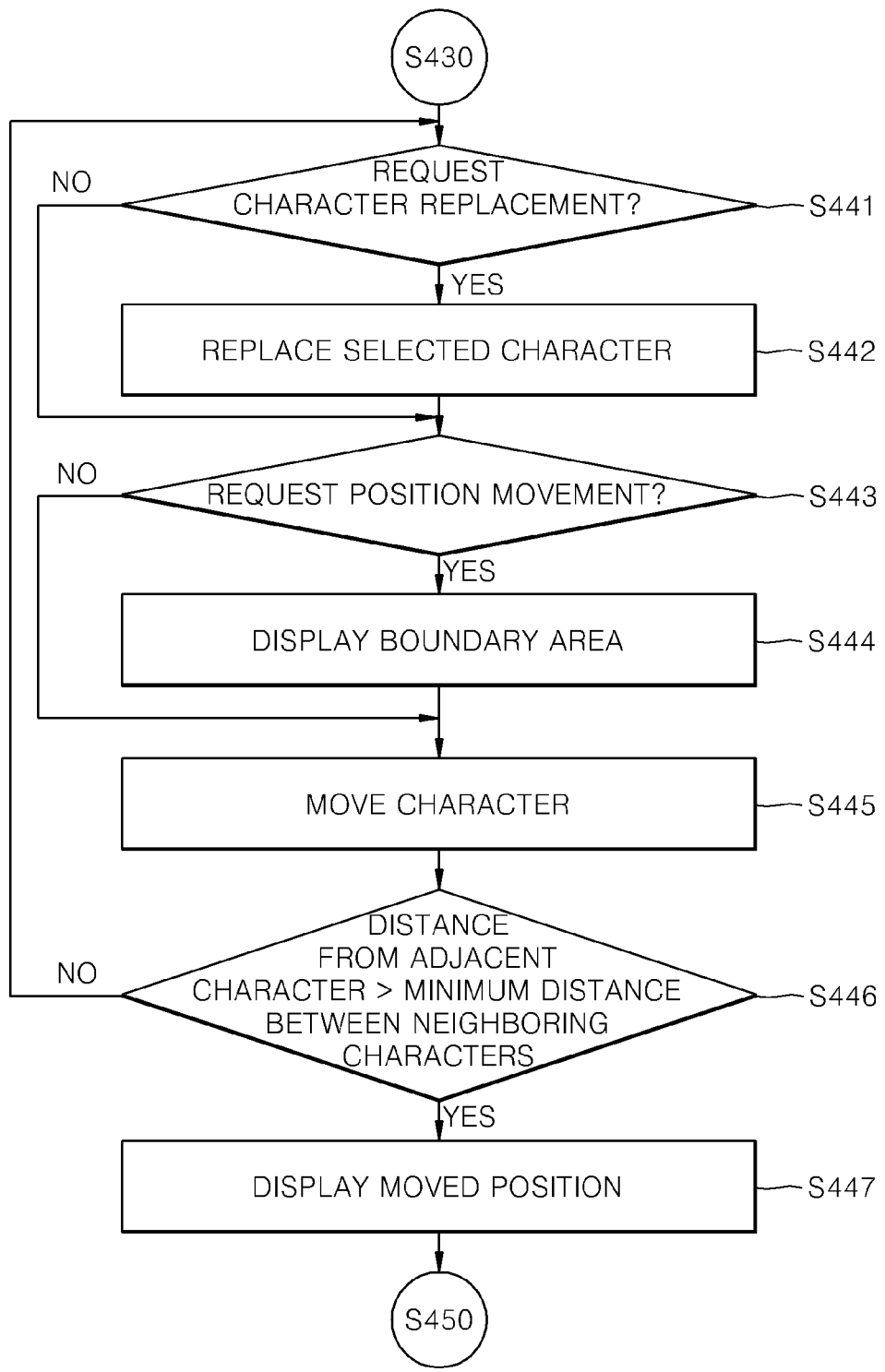
FIG. 6 is a flowchart showing setting of positions of characters according to an embodiment of the present invention.

FIG. 5 is a view showing a character position setting screen according to an embodiment of the present invention, and FIG. 6 is a flowchart showing setting of positions of characters according to an embodiment of the present invention.

The character position setting screen is a default screen of the formation setting unit FMS, and is displayed when the basic button BBT is selected.

The character position setting screen as exemplarily shown in FIG. 5 displays the formation setting unit FMS in the form of a soccer field of an online soccer game by way of example. The formation setting unit FMS further displays eleven characters (character A to character K) according to a set formation. FIG. 5 shows a formation of 4-3-3 as one example. The respective characters (character A to character K) are displayed along with Character Names (CN) as well as Position Names (PN). As the user selects one of the plurality of characters (character A to character K) and moves the selected character to a position of another character, the user may request character replacement (S441). The team management apparatus replaces the selected character upon receiving a replacement request signal for the selected character (S442). In addition, the user may request character replacement by selecting one substitute character from among a plurality of substitute characters displayed on a substitute character display unit, and thereafter moving the selected character to a position of one character displayed on the formation setting unit FMS, or may request character replacement via a menu that is displayed upon character selection. The menu that is displayed upon character selection will be described hereinafter.

Then, it is judged whether or not the user requests position movement of the selected character after selecting one character from among the plurality of characters (character A to character K) (S443). The position movement of the character may be requested by selecting the character selection in a manner similar to character replacement. That is, if one character displayed on the formation setting unit FMS is selected, the team management apparatus of the present invention judges this selection as a character replacement request or a request for position movement of the selected character.

After the character is selected, the team management apparatus displays a boundary area of the selected character (S444). Here, the boundary area refers to an area where the respective characters (character A to character K) may maintain the position name (PN) thereof. The size and shape of the boundary area may be differently set on a per position basis. If the character is moved (S445), it is judged whether or not a distance between the moved character and the most adjacent character is greater than a preset minimum distance between neighboring characters (S446). If the distance between the moved character and the most adjacent character is greater than the preset minimum distance between neighboring characters, movement of the character is determined, and the character is displayed at the moved position (S447). In this case, if the character is moved outward of the boundary area, the position name (PN) of the character is changed according to the moved position. To ensure that the position name is changeable according to the moved position, the team management apparatus may preset the position names (PN), corresponding to all areas to which the character is movable, in the formation setting unit FMS. However, if the distance between the moved character and the most adjacent character is not greater than the preset minimum distance between neighboring characters, it is judged whether or not character replacement is requested (S441). That is, if the character is moved to a position excessively close to another character, the team management apparatus may judge that the user wishes to replace the character, rather than to move the character.

Figure 7:
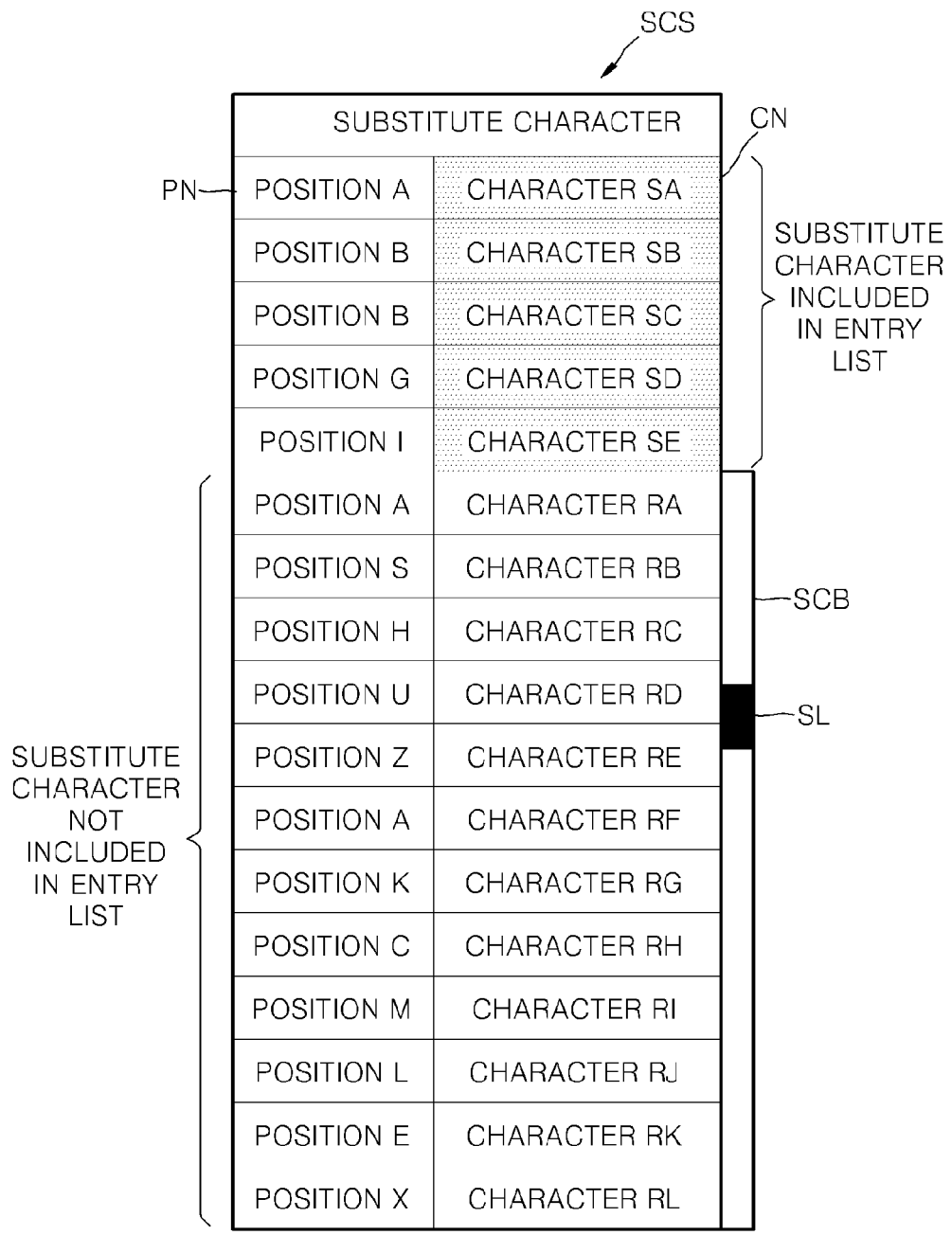
FIG. 7 is a view showing a substitute character display screen according to an embodiment of the present invention.

FIG. 7 is a view showing a substitute character display screen according to an embodiment of the present invention.

As described above, in an online game that adopts team management, a team may include a greater number of characters than the number of characters that may participate in a game. In the present invention, such extra characters are referred to as substitute characters for replacement with characters that are participating in a game. In particular, the substitute characters are frequently utilized in online sports games. Since online sports games are based on real world sports games and a situation in which the players cannot play a game due to injury, for example, substitutes may be required. Accordingly, the present invention displays substitutes based on online soccer games.

Referring to FIG. 7, a substitute character display screen SCS according to the present invention displays character names (CN) as well as position names (PN) to indicate that a plurality of substitute characters is respectively suitable for any given position. In addition, the substitute character display screen SCS of FIG. 7 sorts the plurality of substitute characters into substitute characters included in an entry list and substitute characters not included in the entry list. Sorting of the substitute characters based on the entry list is performed based on management of real world soccer teams. In a real world soccer game, the entry list is organized based upon the starting lineup that is registered as players on the field at the beginning of the game and substitutes who can participate in the game during game play. In the present invention, in addition to the eleven characters displayed on the formation setting unit FMS that correspond to the starting lineup of the real world soccer game, five substitute characters that correspond to the substitutes included in the entry list are set. The other characters as exemplarily shown in FIG. 7 are substitute characters not included in the entry list and cannot participate in a game during game play. Although the substitute characters not included in the entry list cannot participate in the game during game play, the substitute characters not included in the entry list may be selected as team members for a game before the game begins.

Additionally, as exemplarily shown in FIG. 7, since the substitute characters included in the entry list are provided in small number and can immediately participate in the game during game play, the substitute characters included in the entry list are arranged at the uppermost part of the substitute character display screen SCS. In addition, in the case of the substitute characters not included in the entry list, since the corresponding substitute characters are generally provided in great number and displaying all of the substitute and a slide tag SL may be displayed on one side of the substitute character display screen SCS, to assist the user in easily checking even the plurality of substitute characters not included in the entry list.

Figure 8:
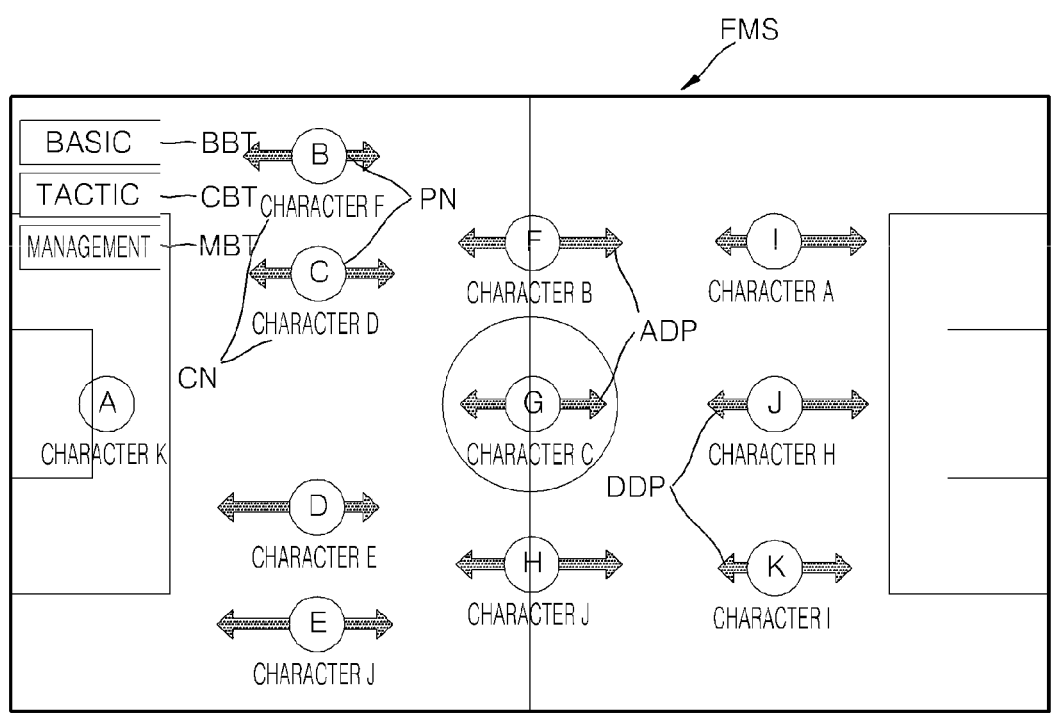
FIG. 8 is a view showing a tactic setting screen according to an embodiment of the present invention.

FIG. 8 is a view showing a tactic setting screen according to an embodiment of the present invention.

The tactic setting screen exemplarily shown in FIG. 8 is a screen to be displayed on the formation setting unit FMS, and is displayed when the tactic button CBT of the formation setting unit FMS is selected. Explaining the tactic setting screen of FIG. 8, the formation setting unit FMS displays a soccer stadium image, similar to the configuration of the character position setting screen, and eleven characters (character A to character K) according to a preset formation. In addition, the respective characters (character A to character K) are provided with character names (CN) and position names (PN). However, differently from the character position setting screen, the tactic setting screen displays bidirectional arrows at both sides of the characters (character A to character J) except for a goalkeeper character (character K). Although FIG. 8 illustrates that bidirectional arrows of the respective characters have different lengths on a per character basis, it is preferable that all characters basically have the bidirectional arrows of the same lengths so long as there is no separate user setting. Among two arrows of each character, one arrow that points toward the goalkeeper character (character K), in other words, that points toward a goal net of a user team is a defense disposition adjustment sign (DDP) to increase defense disposition of the character, and the other arrow that points toward an opposite direction of the goalkeeper character (character K), in other words, that points toward a goal net of an opponent team is an offense disposition adjustment sign (ADP) to increase offense disposition of the character. The defense disposition adjustment sign DDP and the offense disposition adjustment sign ADP are signs to adjust the defense disposition and offense disposition of the character and to display a currently set disposition.

When it is desired to increase the offense disposition of each character, the user may drag the offense disposition adjustment sign (ADP) to increase a length thereof, or may repeatedly select the offense disposition adjustment sign (ADP), thereby increasing the offense disposition of the character. In addition, when it is desired to reduce the offense disposition of each character, for example, when a disposition value of the character exceeds a preset maximum disposition value, the user may drag the offense disposition adjustment sign (ADP) to reduce a length thereof, or may repeatedly select the offense disposition adjustment sign (ADP) until the disposition value of the character returns to a preset minimum disposition value. That is, each of the offense disposition adjustment sign (ADP) and the defense disposition adjustment sign (DDP) may be increased by a predetermined rate whenever the sign is selected, but initialized to the minimum disposition value when the preset maximum disposition value is exceeded. The maximum disposition values of the offense disposition adjustment sign (ADP) and the defense disposition adjustment sign (DDP) may be set to different values.

As described above, the user may adjust the offense disposition and defense disposition of each of the plurality of characters, and each character having the adjusted disposition may show a greater offense participation frequency or a greater defense participation frequency according to preset disposition, which may change details of a game.

Figure 9:
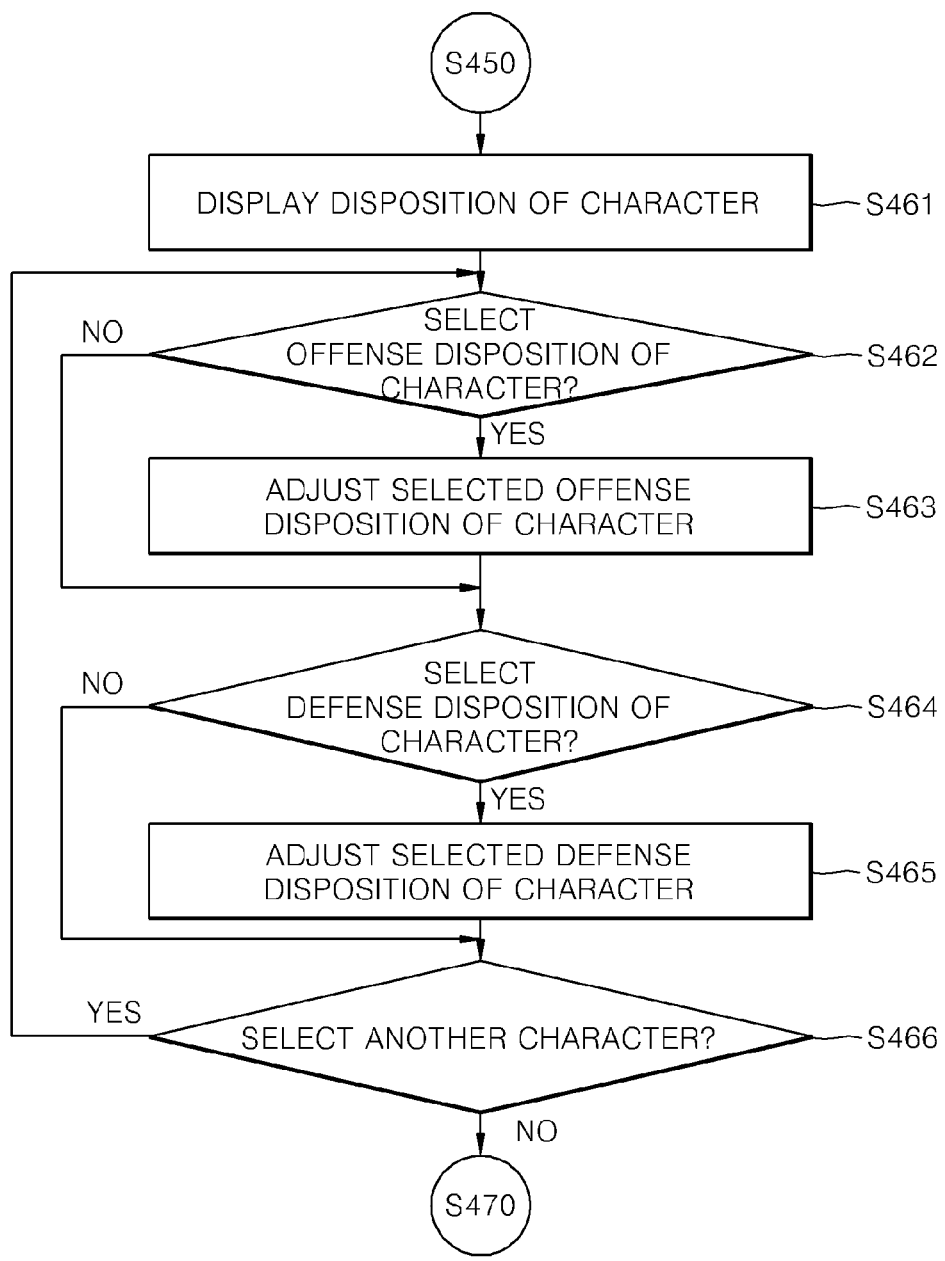
FIG. 9 is a flowchart showing setting of a tactic according to an embodiment of the present invention.

FIG. 9 is a flowchart showing setting of a tactic according to an embodiment of the present invention.

Explaining the sequence of setting a tactic of FIG. 9 with reference to FIG. 8, first, if the tactic button on the formation setting unit FMS is selected (S450), a tactic screen including the offense disposition adjustment sign (ADP) and the defense disposition adjustment sign (DDP) with respect to each of a plurality of characters is displayed on the formation setting unit FMS (S461). Then, it is judged whether or not a selection signal for the offense disposition adjustment sign (ADP) with respect to one character among the plurality of characters is input from the user terminal (S462). If it is judged that the user selects the defense disposition adjustment sign (DDP) of the particular character, the user adjusts the offense disposition of the selected character according to a dragging length of the sign or the number of times the user selects the sign (S463). Meanwhile, it is judged whether or not a selection signal for the defense disposition adjustment sign (DDP) with respect to one character among the plurality of characters is input from the user terminal (S464). If it is judged that the user selects the defense disposition adjustment sign (DDP) of the particular character, the user adjusts the offense disposition according to a dragging length of the sign or the number of times the user selects the sign (S465).

Thereafter, it is judged whether or not the user selects another character (S466). If the user selects another character, adjusting the defense disposition and offense disposition of the selected character is possible.

Figure 10:
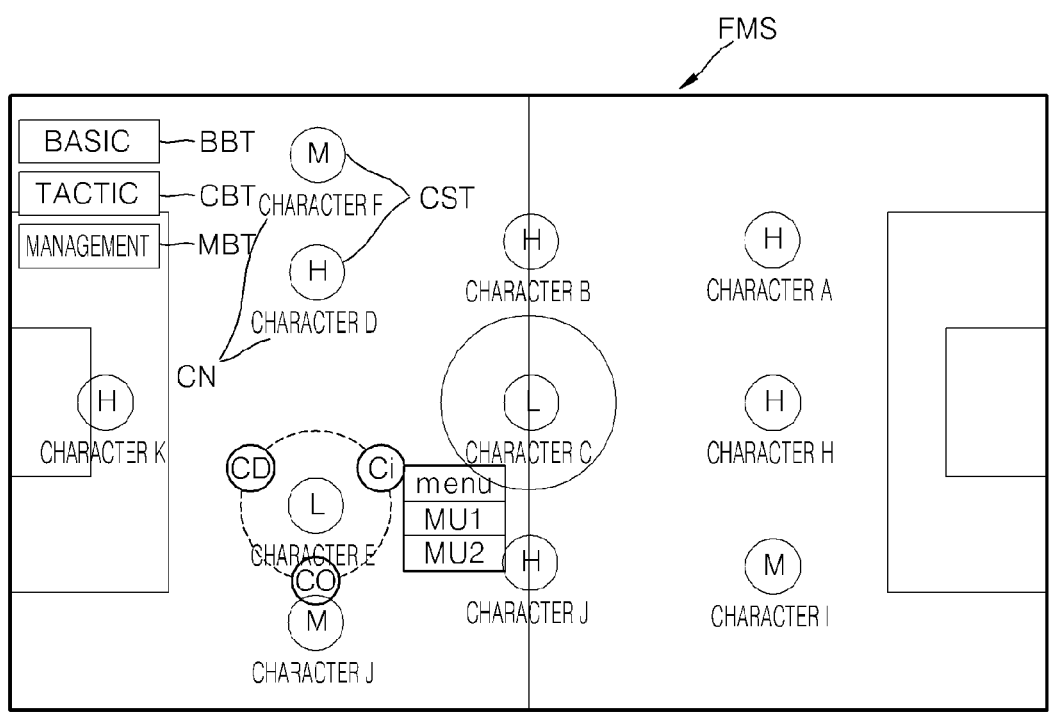
FIG. 10 is a view showing a character management screen according to an embodiment of the present invention.

FIG. 10 is a view showing a character management screen according to an embodiment of the present invention.

The character management screen exemplarily shown in FIG. 10 is a screen that is displayed when the management button MBT of the formation setting unit FMS is selected. Explaining the character management screen of FIG. 10, the formation setting unit FMS displays a soccer stadium image, similar to the character position setting screen, and eleven characters (character A to character K) arranged according to a preset formation. The respective characters (character A to character K) are provided with character names (CN). However, differently from the character position setting screen of FIG. 5 in which the position names (PN) as well as the character names (CN) are displayed, the character management screen of FIG. 10 displays the character names (CN) and character states (CST). The character state (CST) basically represents the physical fitness of each character. Although FIG. 10 represents the physical fitness of the character as either high H, medium M, or low L, the physical fitness may be subdivided, or may be represented by other symbols instead of letters according to game setting. In addition, if it is necessary to display other states, except for the physical fitness, of one of the plurality of characters, the required state may be marked on the corresponding character. For example, assuming that the character F was penalized for a disciplinary infraction, such as a caution, in a previous game, it is more important that the user be aware of the disciplinary infraction of the character than the physical fitness of the character. As such, if a particular character has more important something than the physical fitness in a game, this may be displayed instead of the physical fitness. In addition, by displaying the physical fitness of a character when the user selects the character, it may be possible to allow the user to comprehend all important states of the character.

In FIG. 10, with regard to the character L, a menu for character management is displayed when the user selects the character L. Although batch management of all characters may be performed via the character batch management unit CBM as exemplarily shown in FIG. 3, the user may individually manage the plurality of characters as occasion demands. To this end, in the present invention, if a particular character is selected, a character management menu is displayed around the corresponding character. More specifically, in the present invention, for simplicity of the menu, a plurality of menus is arranged to constitute a ring menu surrounding the selected character. If the user selects one menu of the ring menu, sub-menus of the selected menu may be displayed. Accordingly, the user may easily manage each character using the ring menu displayed around the character as well as the sub-menus.

Figure 11:
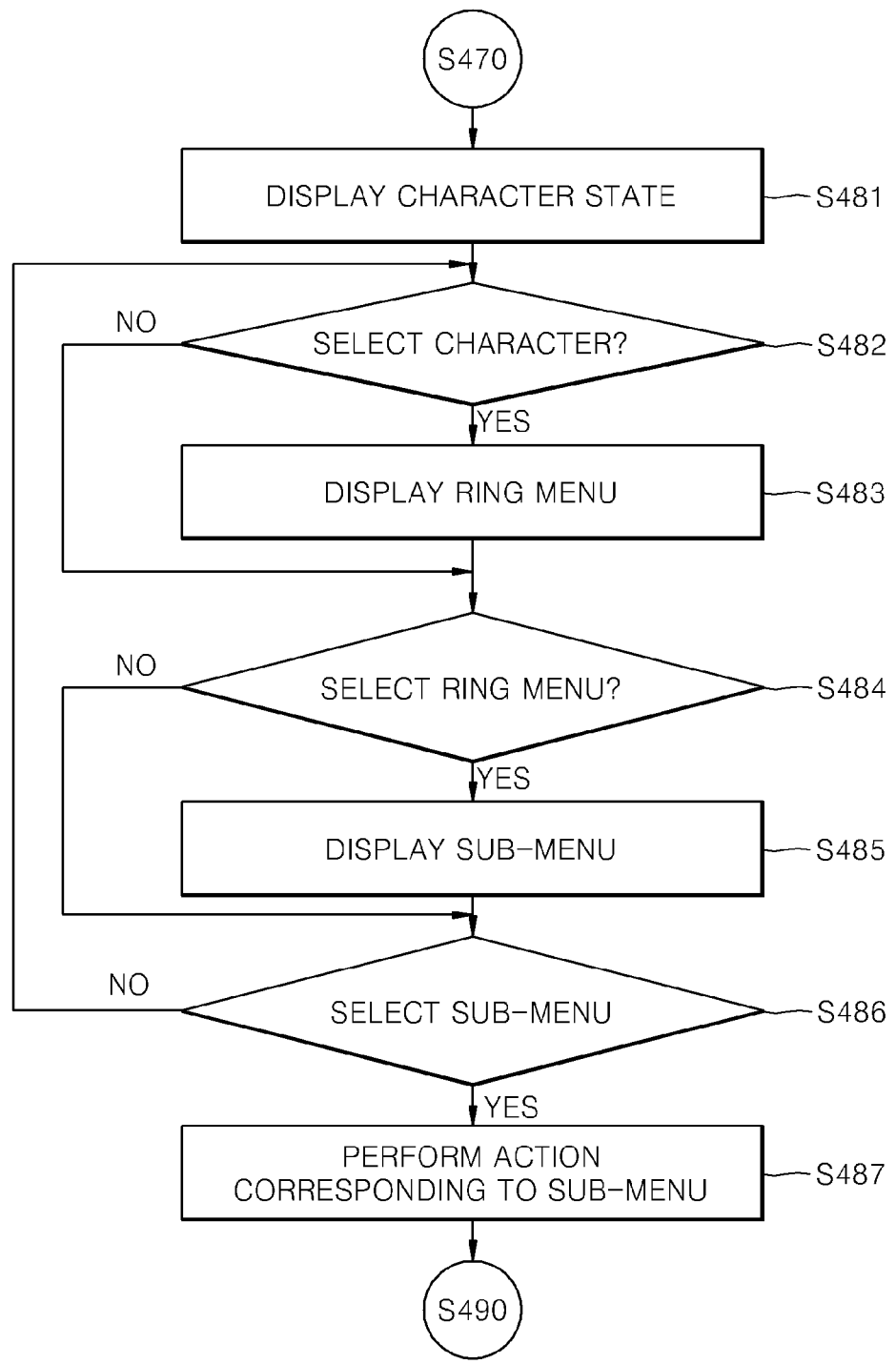
FIG. 11 is a flowchart showing character management according to an embodiment of the present invention.

FIG. 11 is a flowchart showing character management according to an embodiment of the present invention.

Explaining the character management sequence of FIG. 11 with reference to FIG. 10, if the management button MBT of the formation setting unit FMS is selected (S470), a plurality of characters is displayed on the formation setting unit FMS according to a preset formation, and the state of each character is displayed (S481). Then, it is judged whether or not the user selects one character among the plurality of characters (S482). If the user selects a particular character, the ring menu is displayed around the selected character (S483). Thereafter, it is judged whether or not the user selects one menu of the ring menu (S484). If the user selects one menu among a plurality of menus arranged in a ring form, a plurality of sub-menus corresponding to the selected menu is displayed (S485). Then, it is judged whether or not the user selects one sub-menu among the plurality of sub-menus (S486). If the user selects one sub-menu, the team management apparatus performs an action corresponding to the selected sub-menu (S487).

Here, the ring menu and the sub-menus included in the ring menu may be set in various ways according to games, and thus a detailed description thereof will be omitted herein.

In addition, although the ring menu with regard to the selected character has been described above as being displayed only on the character management screen, the ring menu may be displayed even on the position setting screen and the tactic setting screen if the character is selected.

Figure 12:
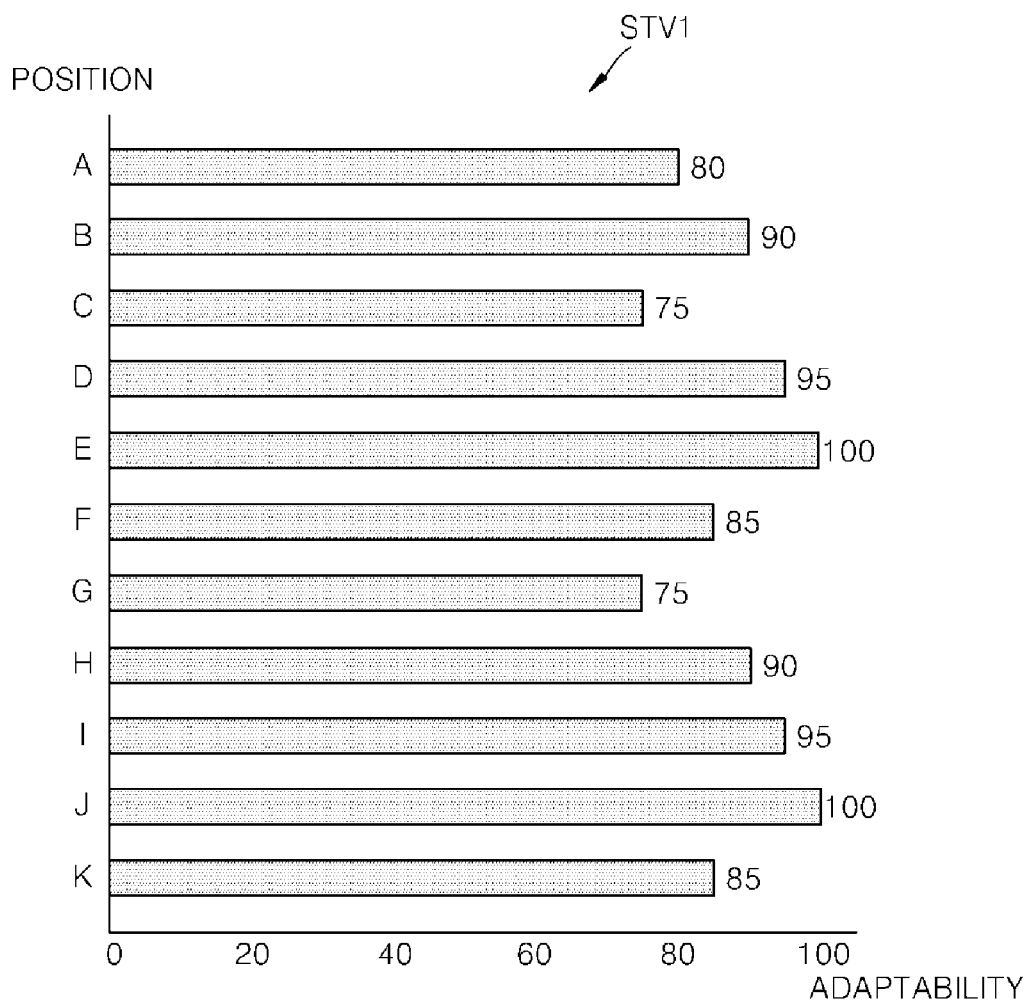
FIG. 12 is a view showing a position adaptability screen according to an embodiment of the present invention.

FIG. 12 is a view showing a position adaptability screen STV according to an embodiment of the present invention.

As described above, the position adaptability PAT is a menu to provide a chart of adaptability of a plurality of characters, arranged according to a selected formation, to respective positions thereof. Providing the chart of position adaptability of all of the plurality of characters arranged according to a selected formation may assist the user in judging whether or not the formation of the whole team is suitable. If the position adaptability tab PAT of FIG. 3 is selected, the position adaptability screen as exemplarily shown in FIG. 12 is displayed on a selected tab display unit STV1.

In FIG. 12, the position adaptability is shown in a graph, an abscissa of which represents adaptability of each character by percentage from 0 to 100%, and an ordinate of which represents each position. In an online soccer game exemplified in the present invention, positions of eleven characters may be present, and thus position adaptability with respect to the eleven characters may be provided.

It will be appreciated that a character having a greater adaptability to a particular position may accomplish higher status points at the particular position. Therefore, the user may easily check a character having low position adaptability from the graph, and substitute the corresponding character for another character having high position adaptability with respect to the corresponding position. Although FIG. 12 illustrates only positions and position adaptability thereof, the corresponding character name (CN) may be displayed around or in a bar that represents the position adaptability, which may assist the user in easily judging a character corresponding to the corresponding position.

Figure 13:
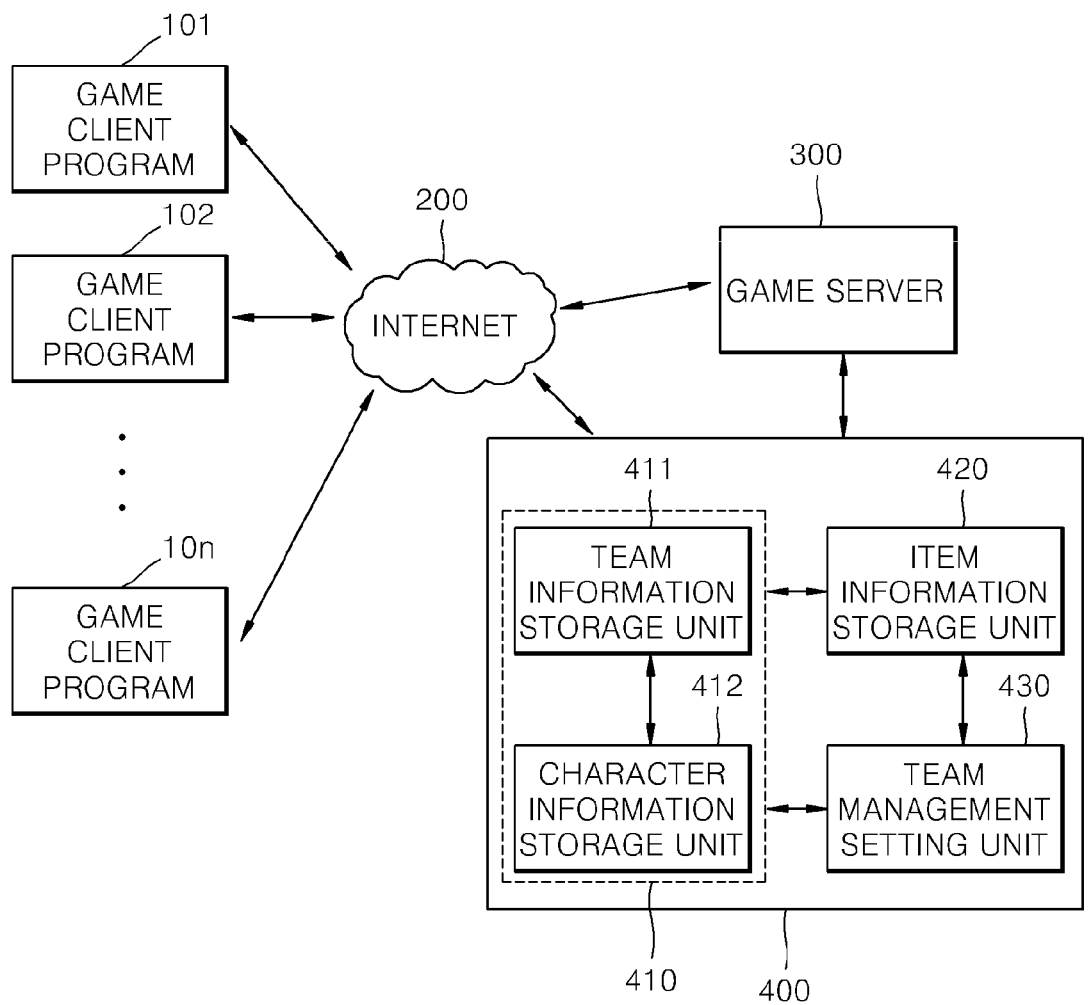
FIG. 13 is a block diagram of an apparatus for managing a team in an online game according to an embodiment of the present invention.

FIG. 13 is a block diagram of an apparatus for managing a team in an online game according to an embodiment of the present invention.

As exemplarily shown in FIG. 13, a team management system of an online game according to an embodiment of the present invention includes a plurality of user terminals 10*l* to 10*n*, Internet 200, a game server 300, and a team management apparatus 400. Each of the plurality of user terminals 10*l* to 10*n* is connected to the game server 300 through the Internet 200, and is provided with a game client for implementation of a game.

The game server 300 provides a web page that the user can access, and also provides the plurality of user terminals 10*l* to 10*n* with several services, such as a variety of Internet games, chatting, society, shopping mall, etc. Although FIG. 13 illustrates a plurality of users as being connected to the game server 300 through computers 10*l* to 10*n*, instead of the computers, there may be other terminals that are connected to the game server 300 through the Internet 200 to perform a game. For example, mobile communication terminals, and Internet connectable televisions may be used.

The game server 300 may include a web database, which stores items to assist the user in performing a variety of functions in a web or a game as well as information regarding the items possessed by the user. The game server 300 sells a variety of items to the user with reference to the web database, and stores user information indicating that the user purchases these items in the web database.

If the user enters a game via a web page, the game server 300 drives game clients previously mounted in the user terminals 10*l* to 10*n*, and the user terminals 10*l* to 10*n* are connected to the game server 300 through the Internet 200 by the driven game clients. Here, although the game clients are assumed to be previously mounted in the user terminals 10*l* to 10*n*, the game server 300 may control installation of game clients for a corresponding game as necessary.

The game server 300 may include a game database (not shown) that stores game control logics on a per game basis. Here, game logics refer to specified rules to enable automated progress of a game according to a predefined rule, and may correspond to a series of game progress procedures.

The team management apparatus 400 includes an information storage unit 410 in which team information as well as character information are stored, an item information storage unit 420 in which information on various items that may be provided in a game and include, for example, a character physical fitness recovery item, is stored, and a team management setting unit 430 that may set a plurality of formations with respect to a user management team by providing a team management screen and may perform character replacement at each position. The information storage unit 410 is divided into a team information storage unit 411 in which team information is stored, and a character information storage unit 412 in which information on each player character is stored. The team information storage unit 411 stores basic team information on teams that are basically provided in a game as well as information on teams that are organized individually by the user. The character information storage unit 412 stores information on a plurality of characters corresponding to information on each team stored in the team information storage unit 411.

Upon receiving a team management screen request signal from the user terminal, the team management setting unit 430 configures a team management screen by acquiring information on a user team and information on a plurality of characters on the user team from the team information storage unit 411 and the character information storage unit 412, and displays the team management screen on the user terminal. In this case, the information acquired from the team information storage unit 411 may include information on characters included in the team and information on at least one formation, and the information on the at least one formation may contain information on a formation that the user directly sets. In addition, the team management setting unit 430 may acquire information on items possessed by the user from the item information storage unit 420.

The team management setting unit 430 stores a plurality of preset formations. If the user requests a particular formation, the team management setting unit 430 may change positions of characters on the team according to the corresponding formation. Thereafter, if the user performs replacement of characters according to the selected formation, or performs change between formations via position movement of the characters, the changed results are stored in the team information storage unit 411.

The team management setting unit 430 provides a tactic setting screen when the tactic button CBT of the formation setting unit FMS is selected, and stores the offense or defense disposition of each character set by the user on the tactic setting screen in the character information storage unit 412. In addition, if an item for team batch management among items possessed by the user that are acquired from the item information storage unit 420 is present, the team management setting unit 430 may display the item on the character batch management unit CBM of the team management screen CBM. If it is judged that the user uses one of the items displayed on the character batch management unit CBM, the item is applied to the plurality of characters included in the team according to a function thereof.

Although the team information storage unit 411, the character information storage unit 412, and the item information storage unit 420 may store all of team information, character information and item information respectively, as occasion demands, the information may also be stored on the game server 300.

Although the team management apparatus 400 is shown as a separate apparatus in FIG. 13, it may be included in the game server 300, and may take the form of a database as occasion demands.

The method and apparatus for managing a team in an online game according to the embodiments of the present invention as described above may be executed by an application that is originally equipped in a terminal (the application may include a program included in, for example, a basic platform or management system equipped in the terminal), or may be executed by an application (i.e. a program) that is installed, by a user, to the terminal through an application provider server, such as a web server associated with a corresponding service or application, or an application store server. In this regard, the method for managing a team in an online game according to the above described embodiments of the present invention may be realized by the application (i.e. the program) that is originally equipped in the terminal or the application that is installed to the terminal by the user, and the method may be recorded in a recording medium that may be read by a computer, for example, a terminal.

The above described functions may be executed as the aforementioned program is recorded in a computer readable recording medium and is executed by a computer.

As described above, to execute the method for managing a team in an online game according to the respective embodiments of the present invention, the aforementioned program may include computer code, such as a C, C++, or JAVA code, machine code, etc., that may be read by a computer processor, such as a Central Processing Unit (CPU).

The code may include function code associated with, for example, a function that defines the above described functions, and may also include control code associated with an execution procedure that assists the computer processor in executing the above described functions in a predetermined fashion.

In addition, the code may further include memory reference related code with respect to additional information required for the computer processor to execute the above described functions, or with respect to information on whether media will be referred to at any position (address) of an internal or external computer memory.

In addition, if the computer processor requires communication with any other remote computers, servers, or the like in order to execute the above described functions, the code may further include communication protocol related code that designates a communication method between the computer processor and any other remote computers, servers, or the like using a computer communication module (for example, a wired and/or wireless communication module) as well as information or media for transmission/reception during communication.

A functional program to realize the present invention, and code and code segments related to the program, for example, may be easily deduced or changed by programmers of the art of the present invention in consideration of, for example, a computer system environment for reading of a recording medium and execution of a program.

The computer readable recording medium, in which the above described program is recorded, may include a ROM, a RAM, a CD-ROM, a magnetic tape, a floppy disc, or an optical media storage device, for example.

In addition, the computer readable recording medium, in which the above described program is recorded, may be distributed in a computer system that is connected to the recording medium via a network, and may store and execute code that may be read in a distributed manner by the computer. In this case, at least one computer among a plurality of distributed computers may execute some of the above proposed functions, and may transmit the execution results to at least one of the other distributed computers. Likewise, the computers that receive the results may execute some of the above proposed functions, and may transmit the execution results to the other distributed computers.

In particular, the computer readable recording medium, in which an application, i.e. a program for execution of the method for managing a team in an online game according to the respective embodiments of the present invention may be a storage medium (for example, a hard disk) included in an application provider server, such as an application store server, a web server related to an application or a corresponding service, or the like, or may be an application provider server.

The computer, which can read the recording medium, in which the application, i.e. the program for execution of the method for managing a team in an online game according to the respective embodiments of the present invention, may include a general PC, such as a general desktop or laptop computer, a smart phone, a tablet PC, a Personal Digital Assistant (PDA), and a mobile terminal such as a mobile communication terminal, and moreover, may be construed as all possible computing devices.

In addition, if the computer, which can read the recording medium, in which the application, i.e. the program for execution of the method for managing a team in an online game according to the respective embodiments of the present invention, is a smart phone, a tablet PC, a PDA, or a mobile terminal, the application may be downloaded from the application provider server into the general PC, and may be installed in the mobile terminal via a synchronization program.

Although all the constituent elements of the embodiments of the present invention have been described as being combined into one or being operated in a combined state, the present invention is not essentially limited to the embodiments. That is, all the constituent elements may be selectively combined into and operated as at least one element within the scope of the present invention. In addition, although all the constituent elements may be realized respectively as independent hardware, some or all of the constituent elements may be selectively combined and be realized as a computer program having a program module that performs some functions or all functions of one piece of hardware or a plurality of pieces of hardware. The codes and code segments constituting the computer program may be easily deduced by those skilled in the art. The embodiments of the present invention may be realized as the computer program is stored in the computer readable medium that can be read by the computer and is read and executed by the computer. The storage medium for the computer program may include a magnetic recording medium, an optical recording medium, and the like.

In the above description, the terms "comprise," "constitutes" or "have" specify the presence of stated constituent elements so long as there is no particular description to the contrary, and therefore should be construed as further including other constituent elements, rather than excluding other constituent elements. All terms including technical or scientific terms, so long as they are not differently defined, have the same meaning as generally understood by those skilled in the art. The generally used terms, such as dictionary terms, should be construed as having the same meaning as the contextual meaning of the related art, and should not be construed as having ideal meaning or excessively formal meaning so long as they are not clearly defined in the present invention.

Although the embodiments of the present invention have been disclosed for illustrative purposes, those skilled in the art will appreciate that various modifications, additions and substitutions are possible, without departing from the scope and spirit of the invention as disclosed in the accompanying claims. Accordingly, the disclosed embodiments of the present invention are given only by way of explanation, rather than limiting the technical idea of the present invention, and the technical scope of the present invention is not limited by the embodiments. The protection range of the present invention should be construed by the following claims, and all technical ideas within the equivalent range thereof should be construed as being within the scope of the present invention.

The invention claimed is:

1. A method for managing a team in an online game, the team management method comprising:
   electronically configuring, by a team management apparatus, a team management screen by receiving electronic data and transforming the received electronic data into one or more formations that designate respective positions of a plurality of characters included in a team managed by the user;
   electronically displaying, by the team management apparatus, the team management screen that contains information on at least one preset formation including a basic formation on a user terminal upon receiving a signal indicating that the user enters the team management screen from the user terminal;
   setting, by the team management apparatus, each information on the at least one formation upon receiving setting related to details of a selected formation among the at least one formation from the user terminal;
   judging, by the team management apparatus, whether or not the number of currently set formations is less than a preset maximum number of formations upon receiving a formation addition request signal from the user terminal, and adding the formation if the number of currently set formations is less than the maximum number of formations; and
   setting, by the team management apparatus, a formation change shortcut key that generates an instruction to immediately change the at least one formation during game play, wherein the display of the team management screen further includes displaying a character management menu display unit that displays an item for batch application to the plurality of characters on the team.

2. The method according to claim 1, wherein the display of the team management screen includes:
   displaying a formation addition unit that displays the at least one formation;
   displaying a formation selection unit that provides a plurality of preset formations;
   displaying a formation setting unit that displays positions of a plurality of characters corresponding to the selected formation among the at least one formation;
   displaying a replacement information display unit that displays information on a selected character to be replaced and a replacement character among the plurality of characters displayed on the formation setting unit;
   displaying a substitute character display unit that displays at least one substitute character that is included in the plurality of characters on the team and is not displayed on the formation setting unit; and
   displaying position adaptability with respect to each of the plurality of characters displayed on the formation setting unit.

3. The method according to claim 2, wherein the display of the formation addition unit includes:
   displaying the at least one preset formation;
   judging whether or not the number of the at least one formation is less than the maximum number of formations; and
   displaying a formation addition button to generate a formation addition request if the number of the at least one formation is less than the maximum number of formations.

4. A method for managing a team in an online game, the team management method comprising:
   electronically configuring, by a team management apparatus, a team management screen by receiving electronic data and transforming the received electronic data into one or more formations that designate respective positions of a plurality of characters included in a team managed by the user;
   electronically displaying, by the team management apparatus, the team management screen that contains information on at least one preset formation including a basic formation on a user terminal upon receiving a signal indicating that the user enters the team management screen from the user terminal;
   setting, by the team management apparatus, each information on the at least one formation upon receiving setting related to details of a selected formation among the at least one formation from the user terminal;

judging, by the team management apparatus, whether or not the number of currently set formations is less than a preset maximum number of formations upon receiving a formation addition request signal from the user terminal, and adding the formation if the number of currently set formations is less than the maximum number of formations; and setting, by the team management apparatus, a formation change shortcut key that generates an instruction to immediately change the at least one formation during game play, wherein the display of the team management screen further includes:

displaying a formation setting unit that displays positions of a plurality of characters corresponding to the selected formation among the at least one formation;

displaying a substitute character display unit that displays at least one substitute character that is included in the plurality of characters on the team and is not displayed on the formation setting unit; and displaying detailed information including a status point of a character selected by the user among the characters displayed on the formation setting unit and a status point of the at least one substitute character.

5. A method for managing a team in an online game, the team management method comprising:

electronically configuring, by a team management apparatus, a team management screen by receiving electronic data and transforming the received electronic data into one or more formations that designate respective positions of a plurality of characters included in a team managed by the user;

electronically displaying, by the team management apparatus, the team management screen that contains information on at least one preset formation including a basic formation on a user terminal upon receiving a signal indicating that the user enters the team management screen from the user terminal;

setting, by the team management apparatus, each information on the at least one formation upon receiving setting related to details of a selected formation among the at least one formation from the user terminal;

judging, by the team management apparatus, whether or not the number of currently set formations is less than a preset maximum number of formations upon receiving a formation addition request signal from the user terminal, and adding the formation if the number of currently set formations is less than the maximum number of formations; and setting, by the team management apparatus, a formation change shortcut key that generates an instruction to immediately change the at least one formation during game play, wherein the display of the team management screen includes:

displaying a formation addition unit that displays the at least one formation;

displaying a formation selection unit that provides a plurality of preset formations; and displaying a formation setting unit that displays positions of a plurality of characters corresponding to the selected formation among the at least one formation, and wherein the setting of each information on the at least one formation includes:

judging whether or not one formation among the plurality formations displayed on the formation selection unit is selected;

displaying positions of the plurality of characters on the formation setting unit corresponding to the selected formation among the at least one formation displayed on the formation addition unit if the formation is not selected;

changing the positions of the plurality of characters displayed on the formation setting unit according to the selected formation if one formation among the plurality of formations displayed on the formation selection unit is selected;

judging whether or not a movement signal for one character among the plurality of characters displayed on the formation setting unit is received from the user terminal;

judging whether or not a distance between a position to which the character is moved upon receiving the movement signal and the most adjacent character is greater than a preset minimum distance between neighboring characters;

displaying a moved character at a moved position if the distance between the moved character and the most adjacent character is greater than the preset minimum distance between neighboring characters;

judging whether or not to substitute the moved character for the most adjacent character if the distance between the moved character and the most adjacent character is less than the preset minimum distance between neighboring characters; and interchanging a position of the moved character with a position of the most adjacent character if a replacement request signal is received from the user terminal.

6. The method according to claim 5, wherein the setting of each information on the at least one formation includes:

judging whether or not a tactic button included in the formation setting unit is selected, and displaying a tactic setting screen to set an offense disposition and a defense disposition of each of the plurality of characters on the formation setting unit if the tactic button is selected;

setting the offense disposition and the defense disposition of each of the plurality of characters displayed on the tactic setting screen;

judging whether or not a management button included in the formation setting unit is selected, and displaying a character management screen that represents a state of each of the plurality of characters including physical fitness on the formation setting unit if the management button is selected; and adjusting the state of each of the plurality of characters displayed on the character management screen.

7. The method according to claim 6, wherein the display of the tactic setting screen includes:

displaying the positions of the plurality of characters corresponding to the selected formation;

displaying an offense disposition adjustment sign to adjust the offense disposition at one side of respective positions of the plurality of characters; and displaying a defense disposition adjustment sign to adjust the defense disposition at one side of respective positions of the plurality of characters.

8. The method according to claim 7, wherein the setting of the offense disposition and the defense disposition of each of the plurality of characters includes:

adjusting the offense disposition according to a drag signal with respect to the offense disposition adjustment sign of each of the plurality of characters upon receiving the drag signal from the user terminal; and adjusting the defense disposition according to a drag signal with respect to the defense disposition adjustment sign of each of the plurality of characters upon receiving the drag signal from the user terminal.

9. The method according to claim 7, wherein the setting of the offense disposition and the defense disposition of each of the plurality of characters includes:
- judging whether or not the offense disposition is less than a preset maximum offense disposition upon receiving a signal for selection of the offense disposition adjustment sign of each of the plurality of characters from the user terminal;
- increasing the offense disposition if the offense disposition is less than the maximum offense disposition;
- setting the offense disposition to a preset minimum offense disposition if the offense disposition exceeds the maximum offense disposition;
- judging whether or not the defense disposition is less than a preset maximum defense disposition upon receiving a signal for selection of the defense disposition adjustment sign of each of the plurality of characters from the user terminal;
- increasing the defense disposition if the defense disposition is less than the maximum defense disposition; and
- setting the defense disposition to a preset minimum defense disposition if the defense disposition exceeds the maximum defense disposition.

10. The method according to claim 6, wherein the display of the character management screen includes:
- displaying the physical fitness of each of the plurality of characters at a position corresponding to the selected formation; and
- if one of the plurality of characters is penalized for a disciplinary infraction in a previously performed game, displaying the disciplinary infraction on the corresponding character.

11. A method for managing a team in an online game, the team management method comprising:
- electronically configuring, by a team management apparatus, a team management screen by receiving electronic data and transforming the received electronic data into one or more formations that designate respective positions of a plurality of characters included in a team managed by the user;
- electronically displaying, by the team management apparatus, the team management screen that contains information on at least one preset formation including a basic formation on a user terminal upon receiving a signal indicating that the user enters the team management screen from the user terminal;
- setting, by the team management apparatus, each information on the at least one formation upon receiving setting related to details of a selected formation among the at least one formation from the user terminal;
- judging, by the team management apparatus, whether or not the number of currently set formations is less than a preset maximum number of formations upon receiving a formation addition request signal from the user terminal, and adding the formation if the number of currently set formations is less than the maximum number of formations; and
- setting, by the team management apparatus, a formation change shortcut key that generates an instruction to immediately change the at least one formation during game play, wherein the display of the team management screen includes:
- displaying a formation setting unit that displays positions of a plurality of characters corresponding to the selected formation among the at least one formation; and
- displaying position adaptability with respect to each of the plurality of characters displayed on the formation setting unit, and wherein the display of the position adaptability includes:
- acquiring position adaptability of each of the plurality of characters displayed on the formation setting unit corresponding to the selected formation; and
- displaying the position adaptability of each of the plurality of characters on a per position basis as a graph.

12. An apparatus for managing a team in an online game, the team management apparatus comprising:
- a team information storage unit that is configured to store information on a plurality of teams, at least one formation of each of which is preset;
- a character information storage unit that is configured to store information on a plurality of characters included in each of the plurality of teams;
- an item information storage unit that is configured to store information on a plurality of items provided in the online game; and
- a team management setting unit that is configured to acquire information on a team possessed by a user and information on a plurality of characters included in the user team from the team information storage unit and the character information storage unit upon receiving a team management screen request signal from a user terminal, that configures a team management screen displaying positions of the plurality of characters according to at least one formation included in the team information to thereby display the team management screen on the user terminal, and that judges whether or not the number of currently set formations is less than a preset maximum number of formations upon receiving a formation addition request signal from the user terminal, and adds the formation if the number of currently set formations is less than the maximum number of formations, wherein the team management screen further includes a character management menu display unit that displays an item for batch application to the plurality of characters on the team.

13. The apparatus according to claim 12, wherein the team management screen includes:
- a formation addition unit that is configured to display the at least one formation;
- a formation selection unit that is configured to provide a plurality of preset formations;
- a formation setting unit that is configured to display positions of a plurality of characters corresponding to a selected formation among the at least one formation;
- a replacement information display unit that is configured to display information on a selected character to be replaced and a replacement character among the plurality of characters displayed on the formation setting unit;
- a substitute character display unit that is configured to display at least one substitute character that is included in the plurality of characters on the team and is not displayed on the formation setting unit; and
- a position adaptability display unit that is configured to display position adaptability with respect to each of the plurality of characters displayed on the formation setting unit.

14. The apparatus according to claim 13, wherein the team management setting unit is configured to store the plurality of preset formations, and change positions of the plurality of characters displayed on the formation setting unit according to the selected formation upon receiving a signal for selection of one formation among the plurality of formations from the user terminal.

15. A non-transitory computer readable recording medium in which a program for realizing a method for managing a team in an online game is recorded, the team management method comprising: by a team management apparatus,
- configuring a team management screen that allows a user to set a formation that designates respective positions of a plurality of characters included in a team managed by the user;
- displaying the team management screen that contains information on at least one preset formation including a basic formation on a user terminal upon receiving a signal indicating that the user enters the team management screen from the user terminal;
- setting each information on the at least one formation upon receiving setting related to details of a selected formation among the at least one formation from the user terminal;
- judging whether or not the number of currently set formations is less than a preset maximum number of formations upon receiving a formation addition request signal from the user terminal, and adding the formation if the number of currently set formations is less than the maximum number of formations; and
- setting a formation change shortcut key that generates an instruction to immediately change the at least one formation during game play, wherein the display of the team management screen further includes displaying a character management menu display unit that displays an item for batch application to the plurality of characters on the team.

16. The non-transitory computer readable recording medium of claim 15, selected from the group consisting of a ROM, a RAM, a CD-ROM, a magnetic tape, a floppy disc, and an optical media storage device.

* * * * *